(12) United States Patent
Kimura et al.

(10) Patent No.: US 7,900,996 B2
(45) Date of Patent: Mar. 8, 2011

(54) CONSTRUCTION MACHINE

(75) Inventors: Shogo Kimura, Ritto (JP); Hajime Ishii, Higashiomi (JP); Hiroshi Tabeta, Konan (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 12/530,470

(22) PCT Filed: Jul. 4, 2008

(86) PCT No.: PCT/JP2008/062528
§ 371 (c)(1),
(2), (4) Date: Sep. 9, 2009

(87) PCT Pub. No.: WO2009/022510
PCT Pub. Date: Feb. 19, 2009

(65) Prior Publication Data
US 2010/0102594 A1 Apr. 29, 2010

(30) Foreign Application Priority Data
Aug. 13, 2007 (JP) ................................ 2007-210949

(51) Int. Cl.
B62D 33/06 (2006.01)
(52) U.S. Cl. .................................................. 296/190.09
(58) Field of Classification Search .............. 296/190.09
See application file for complete search history.

(56) References Cited

U.S. PATENT DOCUMENTS 6,290,286 B1 *  9/2001  Murakami et al. ....... 296/190.09
7,401,848 B2 *  7/2008  Haboon et al. .......... 296/190.09

FOREIGN PATENT DOCUMENTS

| JP | 4-27618 A | 1/1992 |
| JP | 2002-121770 A | 4/2002 |
| JP | 2005-330772 A | 12/2005 |
| JP | 2006-2479 A | 1/2006 |
| JP | 2006-273055 A | 10/2006 |
| JP | 2007-1433 * | 1/2007 |

* cited by examiner

Primary Examiner — Dennis H Pedder
(74) Attorney, Agent, or Firm — Mattingly & Malur, P.C.

(57) ABSTRACT

A seat support platform (17) is provided on a floor panel (13) of a floor member (12) of a cab (11). An air conditioner unit (25) is installed internally of the seat support platform (17). An under floor duct (27) is provided on the lower side surface (13C) of the floor panel (13) to form an external air induction passage (30) to guide external air from outside of the cab (11) toward an external air intake port (25H) of the air conditioner unit (25). Under floor duct (27) can be provided integrally with the floor member (12) without protrusion to the lower side, and the under floor duct (27) can supply cool external air into the cab (11). Even in the case of a small size hydraulic excavator, the under floor duct (27) can be provided integrally on the floor member (12) to secure broader space in the cab (11).

6 Claims, 18 Drawing Sheets

CONSTRUCTION MACHINE

TECHNICAL FIELD

This invention relates to a construction machine like a hydraulic excavator, and more particularly to a construction machine having an indoor unit of an air conditioning system installed within a cab.

BACKGROUND ART

Generally, a hydraulic excavator as a construction machines, is largely constituted by an automotive vehicular lower structure, an upper revolving structure which is swingably mounted on the vehicular lower structure, and a working mechanism liftably mounted at the front side of the upper revolving structure.

Further, the upper revolving structure is largely constituted by a revolving frame which is arranged to serve as a support structure, an engine for driving a hydraulic pump which is mounted on a rear portion of the revolving frame, and a cab which is built on the front side of the engine. That cab is composed of a floor member having a floor panel laid on a front portion of the revolving frame, a seat support platform which is mounted on the floor panel of the floor member, an operator's seat which is mounted on the seat support platform, and a cab box which is provided on the floor panel and arranged to enclose four sides and top side of the operator's seat.

Furthermore, for the purpose of improving the working environment of a dwelling space within a cab for operators, an air conditioner unit is installed to condition inhaled air to supply conditioned cool or warm air. The air conditioner unit of this sort is installed, for example, in an air conditioner unit accommodation room which is provided between the seat support platform and the floor panel (e.g., for example, Patent Literature 1: Japanese Patent Laid-Open No. 2002-121770).

In some cases, the operation of an air conditioner unit on a hydraulic excavator is switchable between an internal air circulation mode, in which internal air within a cab is inhaled and conditioned for supply to the cab, and an external air induction mode in which external air is taken in from outside the cab through a duct to supply conditioned air to the cab. In such a case, for example, an external air inlet which takes in external air is opened in an outer peripheral surface of the revolving frame to avoid inflow of warmed air from the side of the engine. The external air inlet, which is provided on the revolving frame side, is connected to an air conditioner unit within the cab by the use of an air intake hose which is provided separately (e.g., for example, Patent Literature 2: Japanese Patent Laid-Open No. H4-27618).

Now, in the case of the hydraulic excavator in Patent Literature 2 mentioned above, the external air inlet is opened in an outer peripheral surface of the revolving frame to avoid inflow of warmed air from the side of the engine, and the external air inlet and the air conditioner unit is connected by a hose which is provided separately. This hose has a wide passage area in section to ensure passage of air, and requires an additional hose installation space under a floor assembly.

However, in the case of a small hydraulic excavator like the one as described in Patent Literature 1, which is generally called "a mini shovel", the upper revolving structure is built in a compact form, for example, with a swing motor, control valve and a large number of hydraulic hoses are compactly laid out in a narrow space under the floor panel of the cab.

Accordingly, in the case of a small hydraulic excavator as mentioned above, a difficulty is encountered in finding an extra space for installation of a hose which connects an external air inlet with an air intake port of an air conditioner unit. Therefore, an external air inlet has to be necessarily located at a position which is not distant enough from an engine, despite degradations in cooling efficiency caused by inflow of heated air from the engine.

DISCLOSURE OF THE INVENTION

In view of the above-discussed problem with the prior art, it is an object of the present invention to provide a construction machine which is arranged to obviate the use of a hose in connecting an air conditioner unit with an external air inlet which is located in a relatively cool place, for enhancing the cooling effect of the air conditioner unit.

(1) In accordance with the present invention, there is provided a construction machine, having a vehicular lower structure, and an upper revolving structure swingably mounted on the vehicular lower structure, having a cab mounted on a front side of a revolving frame which constitutes a sturdy support structure; the cab being composed of a floor member mounted on the revolving frame and including a floor panel, a seat support platform mounted on the floor panel of the floor member to support thereon an operator's seat to be taken by an operator, the seat support platform internally defining an air conditioner unit accommodation space, a cab box built on the floor member to define an operator's dwelling space around the operator's seat and provided with an entrance way at an outer side position, and an air conditioner unit installed in the air conditioner unit accommodation space to condition intake air and to supply conditioned air to the cab box.

In order to solve the above-discussed problem, according to the present invention, an under floor duct is provided on the lower side surface of the floor panel of the floor member to form an external air induction passage to supply external air to the air conditioner unit from outside the cab.

With the arrangements just described, the under floor duct which is attached on the lower side of the floor member of the cab can be built effectually in a space under a floor panel of the floor member even in the case of a small construction machine. The under floor duct which is provided on the floor member can be arranged to run along the lower surface of the floor panel, and the cool and clean external air can be taken in trough the under floor duct.

Thus, the under floor duct can be integrally built in a floor member even in the case of a small construction machine which cannot secure a space for installing a hose which is used to take in the external air on the lower side of a floor member. From this arrangement, permitting to take in and supply cool and clean air from outside to an air conditioner unit through the under floor duct to enhance cooling effects of the air conditioner unit for improving a working environment in a dwelling space in the cab.

Further, the under floor duct can be extended to a desired position within the limits of the lower surface of the floor member, so that an air inlet port of an air conditioner unit can be located at an arbitrary position with a greater degree of freedom, particularly with regard to the position of installation of the air conditioner unit. A space of lower side of the seat support platform can make use of installation of the air conditioner unit, so that the space in the cab can be expended.

On the other hand, the provision of an under floor duct on the lower side of a floor member results in a floor member which has a reinforced three-dimensional structure and the strength of the floor member is increased. Further, since the under floor duct is provided on the floor member, the floor member and the floor duct can be constituted as a subassembly, so that the efficiency of an assembling work is enhanced.

(2) In this instance, according to the present invention, an external air inlet is provided at one side surface of the floor member to let external air flow into the under floor duct, and an external air outlet port is provided at a rear side surface of the floor member to let external air flow out from the under floor duct to the air conditioner unit.

With the arrangement just described, the external air inlet port is located at one side of the floor member where possibilities of intrusion of rainwater and entrainment of dust, which is raised into the air when the construction machine is in travel or in operation, are very low. Thus, for example, it becomes possible to reduce the frequency of filter cleaning jobs and to prolong the service life of the external air filter.

Further, external air is delivered to the air conditioner unit from the under floor duct through the external air outlet port which is located at the rear of the floor member, that is, at a position away from the external air inlet port. Thus, the external air outlet port of the under floor duct can be located at a suitable position depending upon the position of an air intake port of the air conditioner unit. This gives a high degree of freedom in laying out the air conditioner unit.

(3) According to the present invention, the entrance way is provided at a left side of the cab box, the external air inlet port is opened in a lower portion of the floor member transversely at an opposite side from the entrance way of the cab box, and the external air outlet port is opened in a lower portion of a rear partition panel of the floor member.

In this case, the external air outlet port of the under floor duct is opened in a lower portion of the right-hand side panel of the floor member, at a position distant from heat sources, for example, such as engine and hydraulic pump. Accordingly, unheated cool air with less dust can be taken into the under floor duct through the external air inlet port. Besides, since the external air outlet port is opened in a lower portion of the rear partition panel of the floor member, external air in circulation through the under floor duct can be supplied to the air conditioner unit under the operator's seat through the rear partition panel of the floor member.

(4) According to the invention, a filter fitting hole is provided at a rear side surface of the floor member adjacently to the external air outlet port, and a filter accommodation case which accommodates a filter is interposed between the external air outlet port and the filter fitting hole to remove dust from external air to be supplied to the air conditioner unit.

Thus, in this case, the filter accommodation case can supply the external air which comes out of the external air outlet port of the under floor duct to the air conditioner unit through the filter fitting hole. A filter unit which is set in the filter accommodation case can be replaced from rear side of the floor member whenever necessary.

(5) Further, according to the invention, the floor panel of the floor member is arranged to provide a foot rest area in an upper front section for an operator and to provide an equipments mount area in an upper rear section for mounting the seat support platform and air conditioner unit thereon; the under floor duct being attached to a lower side surface of the equipments mount area of the floor member.

In this case, the under floor duct is attached to the lower side surface of the equipments mount area in a rear side section of the floor member. That is to say, the seat support platform and air conditioner unit can be mounted on the equipments mount area which has the under floor duct attached on the lower side surface. Thus, the air conditioner unit and the under floor duct can be mounted compactly on the equipments mount area.

(6) According to the invention, the floor member is provided with a lower extension portion at a rear side, which lower extension portion being extended downward from the floor panel, and the external air induction passage is formed by the combination of the lower side surface of the floor panel, the lower extension portion and said under floor duct which is formed into a frame structure.

The external air induction passage can be formed by attaching the under floor duct to the lower side surface of the floor member in such a way as to make a frame structure in combination with the lower side surface of the floor panel and the lower extension of the floor member. Thus, by utilization of a surface on the lower side surface of the floor panel and the lower extension of the floor member, the external air induction passage can be easily assembled by the use of a reduced number of parts and in a simplified form.

(7) According to the present invention, the air conditioner unit is provided with a transversely extending main casing to accommodate therein a blower fan, evaporator, heater core and internal/external switch member, the main casing being provided with an internal air intake port at one lateral side to take in air in the cab as internal air, the main casing being provided with an external air inlet port at rear face to take in effluent external air from the under floor duct and main casing is provided with a conditioned air outlet for supply of conditioned air to the cab.

Thus, when the air conditioner unit is switched to an internal air intake mode by way of the internal/external switch member, internal air which is inhaled through the internal air intake port is passed through the evaporator or heater core by the blower fan for making the conditioned air, and the conditioned air is supplied to the cab through the conditioned air outlet. On the other hand, when the air conditioner unit is switched to an external air mode, effluent external air from the under floor duct is inhaled through the external air inlet port on the main casing, and conditioned to a comfortable temperature at the evaporator or heater core for supply into the cab through the conditioned air outlet port.

(8) Further, according to the invention, the cab is tiltably mounted on a fulcrum point at the front of the revolving frame to take a tilt-up and a tilt-down position by turning a rear side, and the seat support plat form, air conditioner unit and under floor duct are tilted with the floor member.

Thus, in this case, the cab can be tilted up and down together with the floor member, seat support platform, air conditioner unit and under floor duct. That is to say, free of restrictions which are imposed by an external air intake hose in the prior art, the cab can be tilted up and down from the revolving frame, permitting to perform maintenance and service jobs efficiently in a facilitated manner.

DESCRIPTION OF REFERENCE NUMERALS

Figure 1:
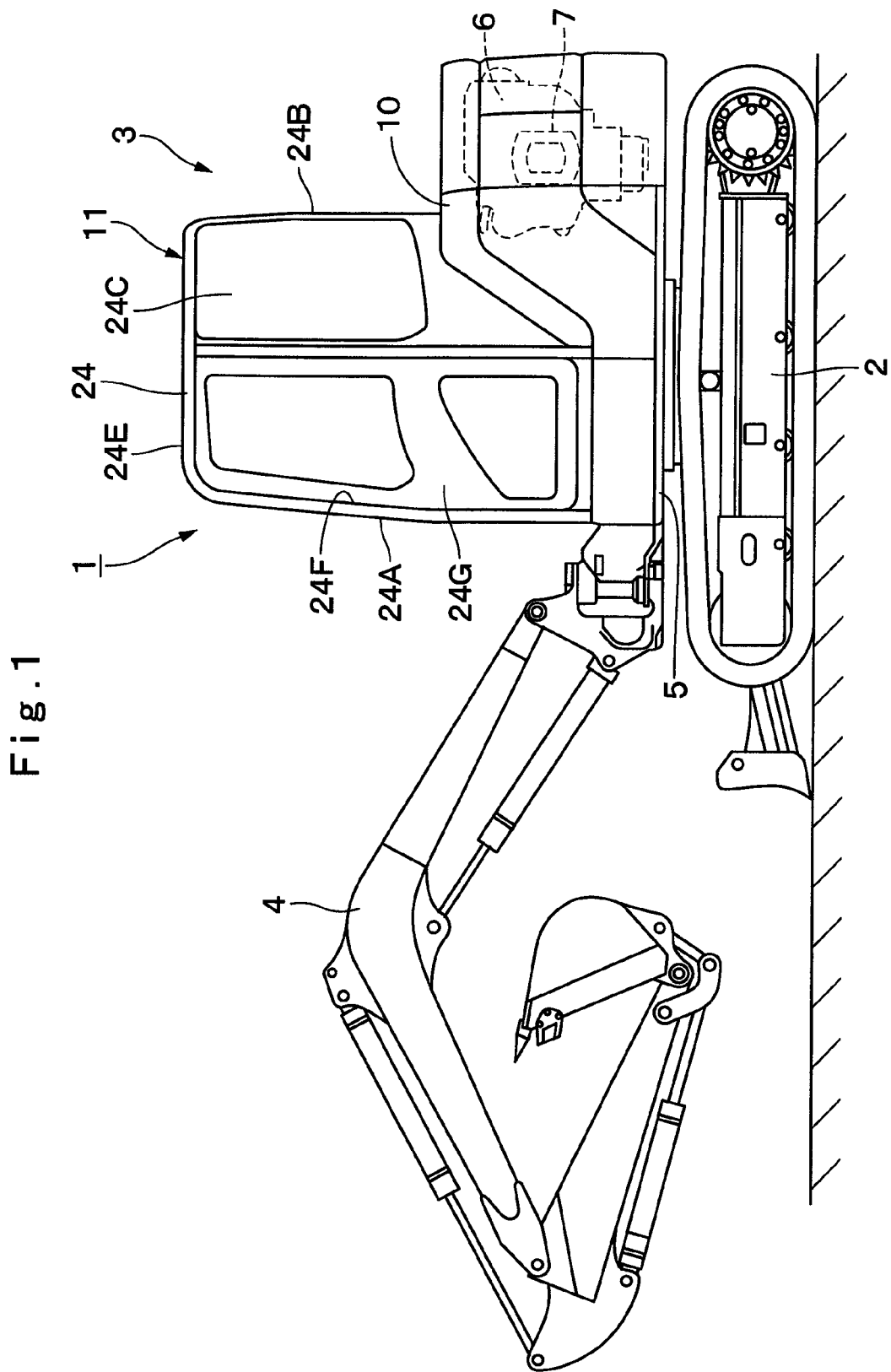
FIG. 1 is a front view of a hydraulic excavator to which the present invention is applied.

| | |
|---|---|
| 1: | Hydraulic excavator (construction machine) |
| 5: | Revolving frame |
| 6: | Engine |
| 11: | Cab |
| 12: | Floor member |
| 13: | Floor panel |
| 13A: | Foot rest area |
| 13B: | Equipments mount area |
| 13C: | Lower side surface |
| 14: | Rear partition panel |
| 14A: | Riser panel |
| 14B: | Transverse top panel |
| 14C, 16A: | Lower extension portion |
| 14D: | Connector box |
| 14D1: | Filter fitting hole |
| 15: | Left-hand side panel |
| 16: | Right-hand side panel |
| 17: | Seat support platform |
| 18: | Air conditioner unit accommodation room |
| 19: | Operator's seat |
| 22: | External air inlet port |
| 23: | External air outlet port |
| 24: | Cab box |
| 24F: | Entrance way |

-continued

DESCRIPTION OF REFERENCE NUMERALS

| | |
|---|---|
| 25: | Air conditioner unit |
| 25A: | Main casing |
| 25B: | Blower fan |
| 25C: | Evaporator |
| 25D: | Heater core |
| 25E: | Internal/external switch member |
| 25F: | Conditioning air outlet switch member |
| 25G: | Internal air intake port |
| 25H: | External air intake port |
| 25J, 25K: | Supply port |
| 26: | Filter accommodation case |
| 26A: | External air filter |
| 27, 41: | Under floor duct |
| 28: | Inclined duct plate |
| 29: | Straight duct plate |
| 30, 42: | External air induction passage |
| 30A: | Inflow opening |
| 30B: | Outflow opening |
| G: | Gap between floor member and tank cover |

BEST MODE FOR CARRYING OUT THE INVENTION

Hereafter, with reference to FIGS. 1 through 19, the present invention is described more particularly by way of its preferred embodiments which are applied to a small hydraulic excavator, as an example of construction machines.

Figure 2:
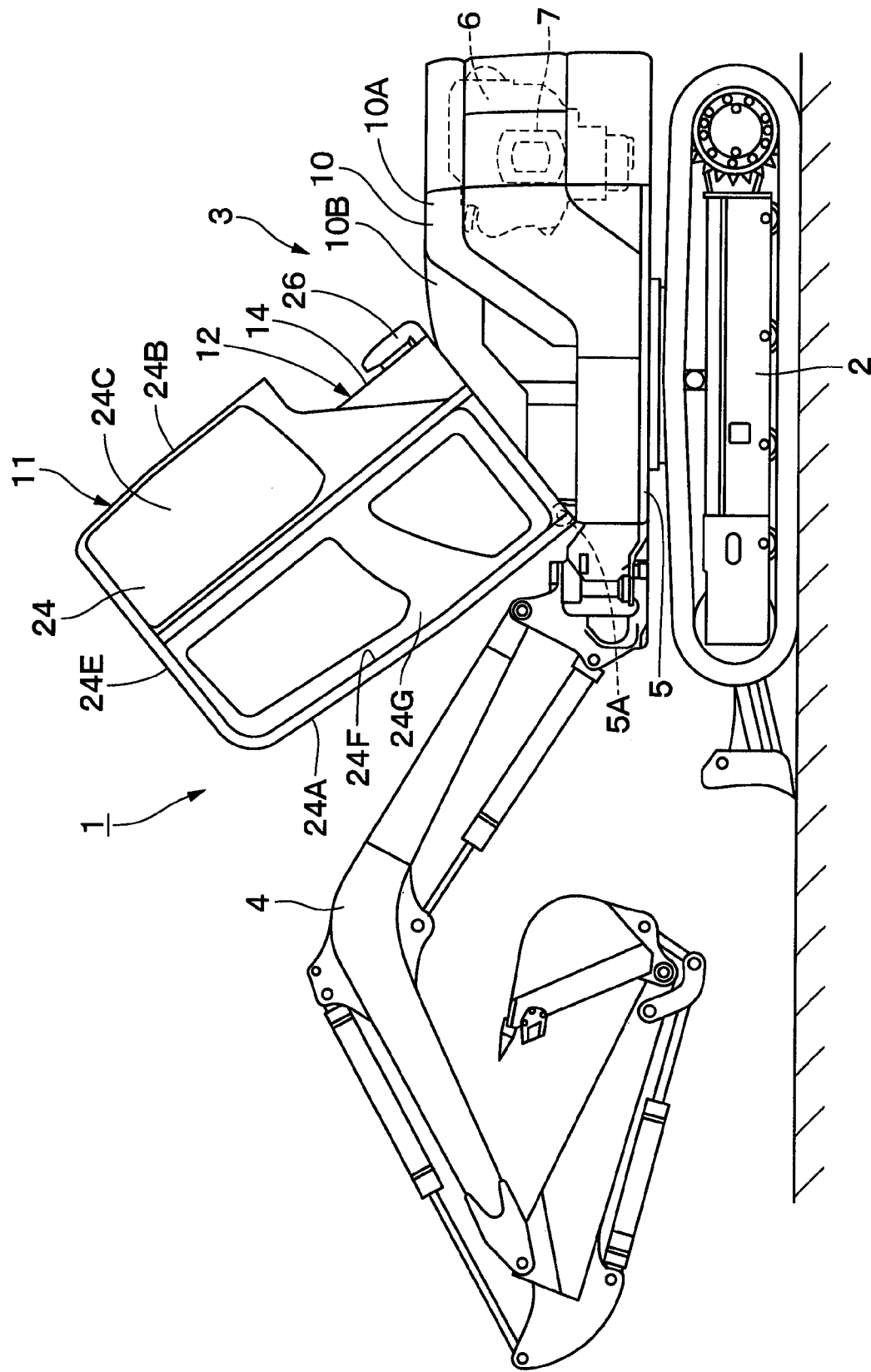
FIG. 2 is a front view of the excavator of FIG. 1, showing a cab in a tilt-up position.

In FIGS. 1 and 2, indicated at 1 is a small hydraulic excavator as a particular example of construction machines to which the present invention is applicable. This hydraulic excavator 1 is largely constituted by a vehicular lower structure 2, an upper revolving structure 3 which is swingably mounted on the vehicle lower structure 2, and a working mechanism 4 liftably supported at the front of the upper revolving structure 3 to perform a ground excavating work and other ground works.

Figure 3:
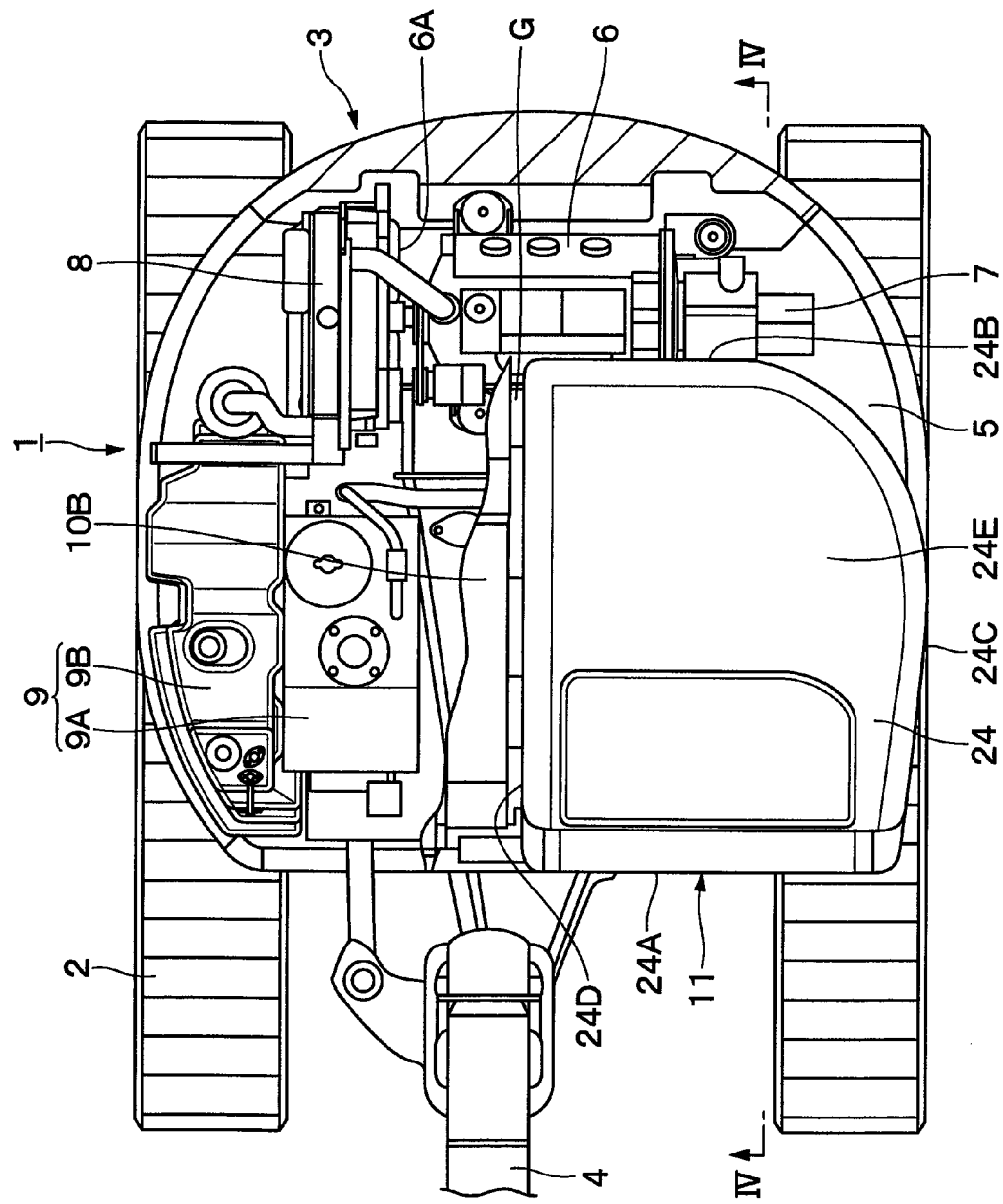
FIG. 3 is a schematic plan view of an upper revolving structure which is partly cut away, showing the layout of onboard equipments on an enlarged scale.
Figure 4:
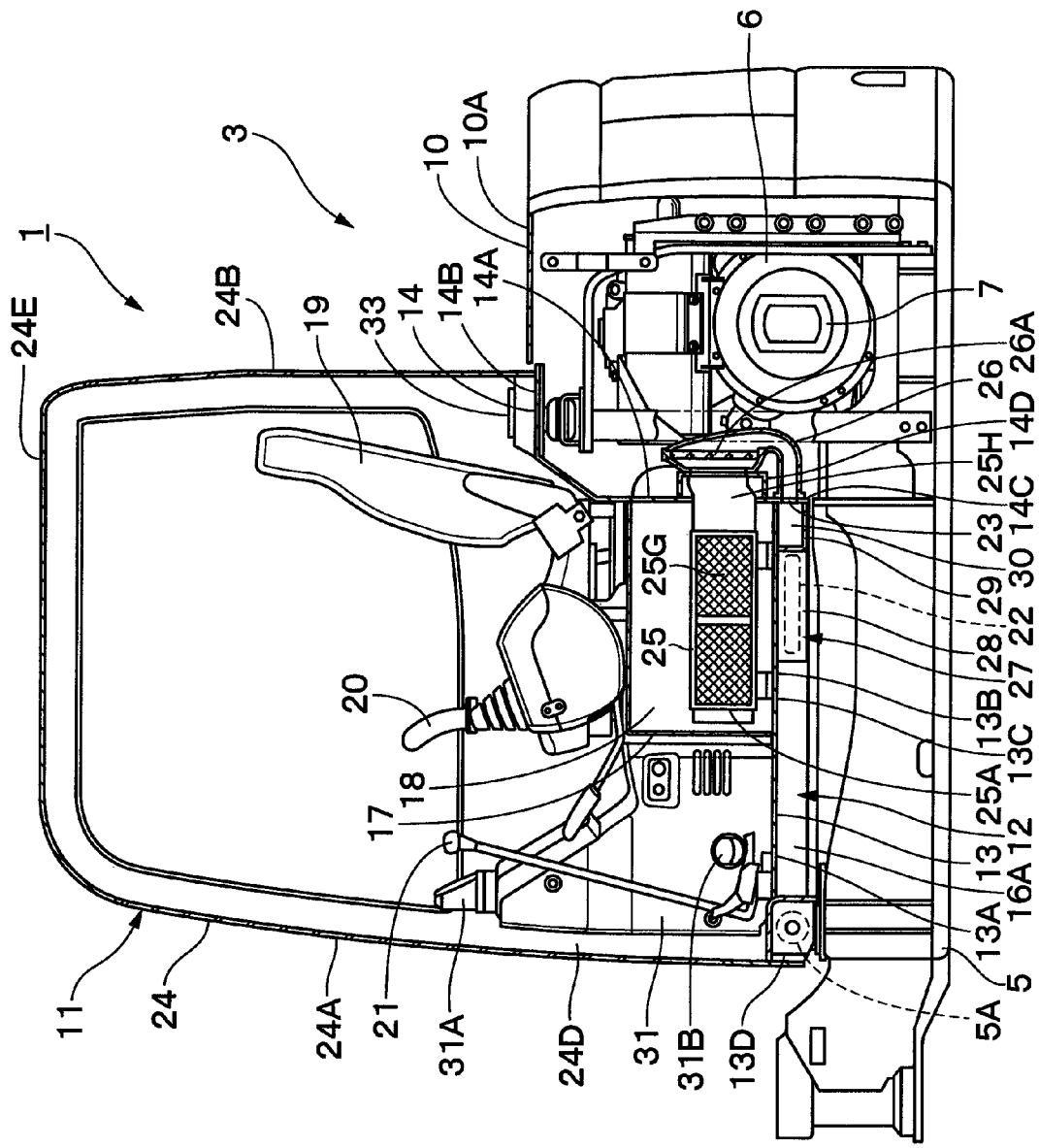
FIG. 4 is a schematic sectional view of the upper revolving structure, taken from the direction of arrows IV-IV in FIG. 3.

Further, as shown in FIGS. 3 and 4, the upper revolving structure 3 is largely constituted by a revolving frame 5 which is formed of steel plates and pipes to serve as a sturdy support structure, an engine 6 which is transversely mounted on a rear portion of the revolving frame 5, a hydraulic pump 7 which is mounted on the left side of the engine 6, a heat exchanger 8 including a radiator and an oil cooler which are located on a right side portion of the revolving frame 5 face to face with a cooling fan 6A of the engine 6, tanks 9 including an operating oil tank 9A and a fuel tank 9B which are mounted on the revolving frame 5 on the front side of the heat exchanger 8, an exterior cover 10 which is arranged to house the above-mentioned engine 6 and tanks 9, and a cab 11 which will be described hereinafter.

Figure 5:
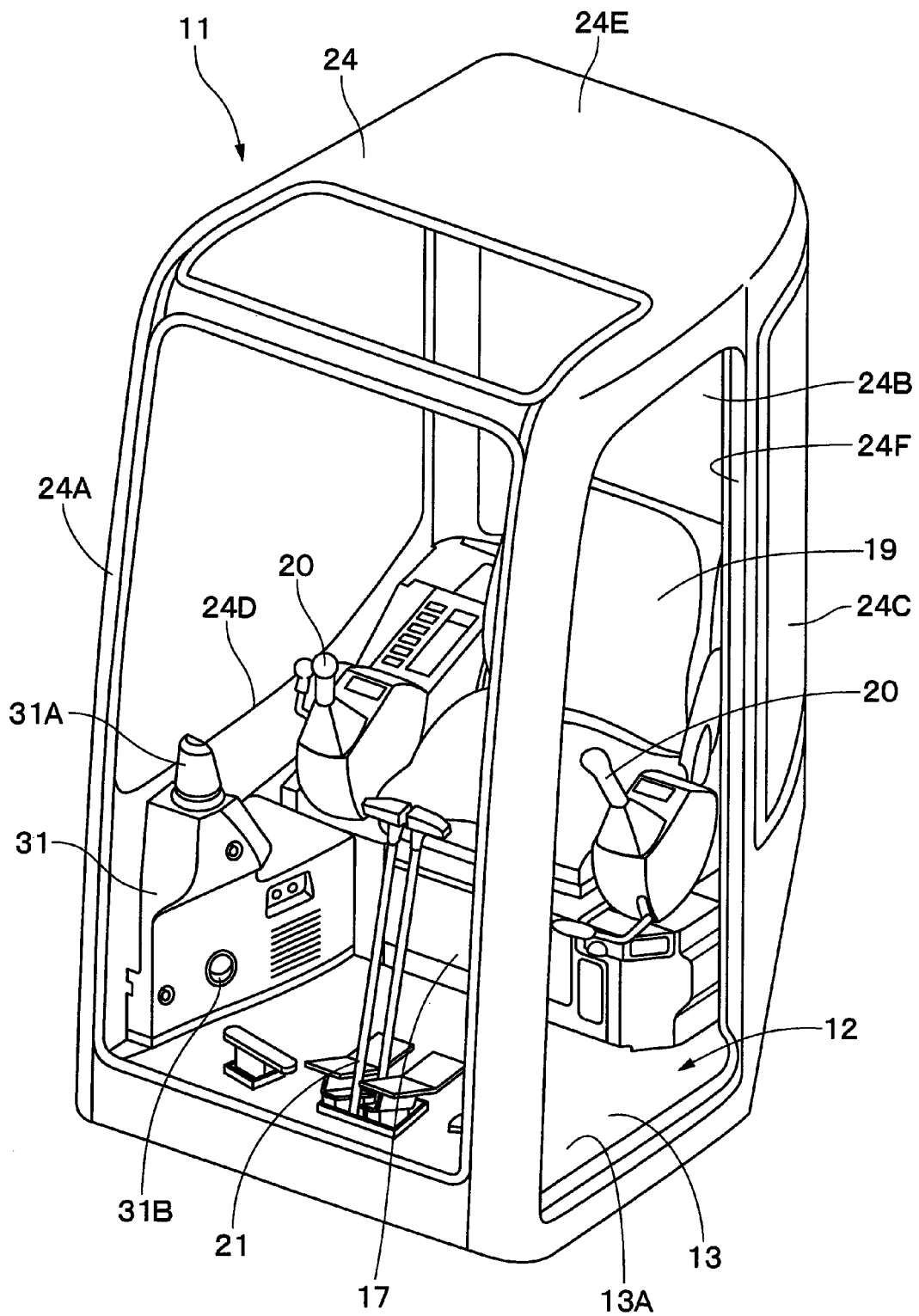
FIG. 5 is a schematic perspective view showing the cab on an enlarged scale.
Figure 6:
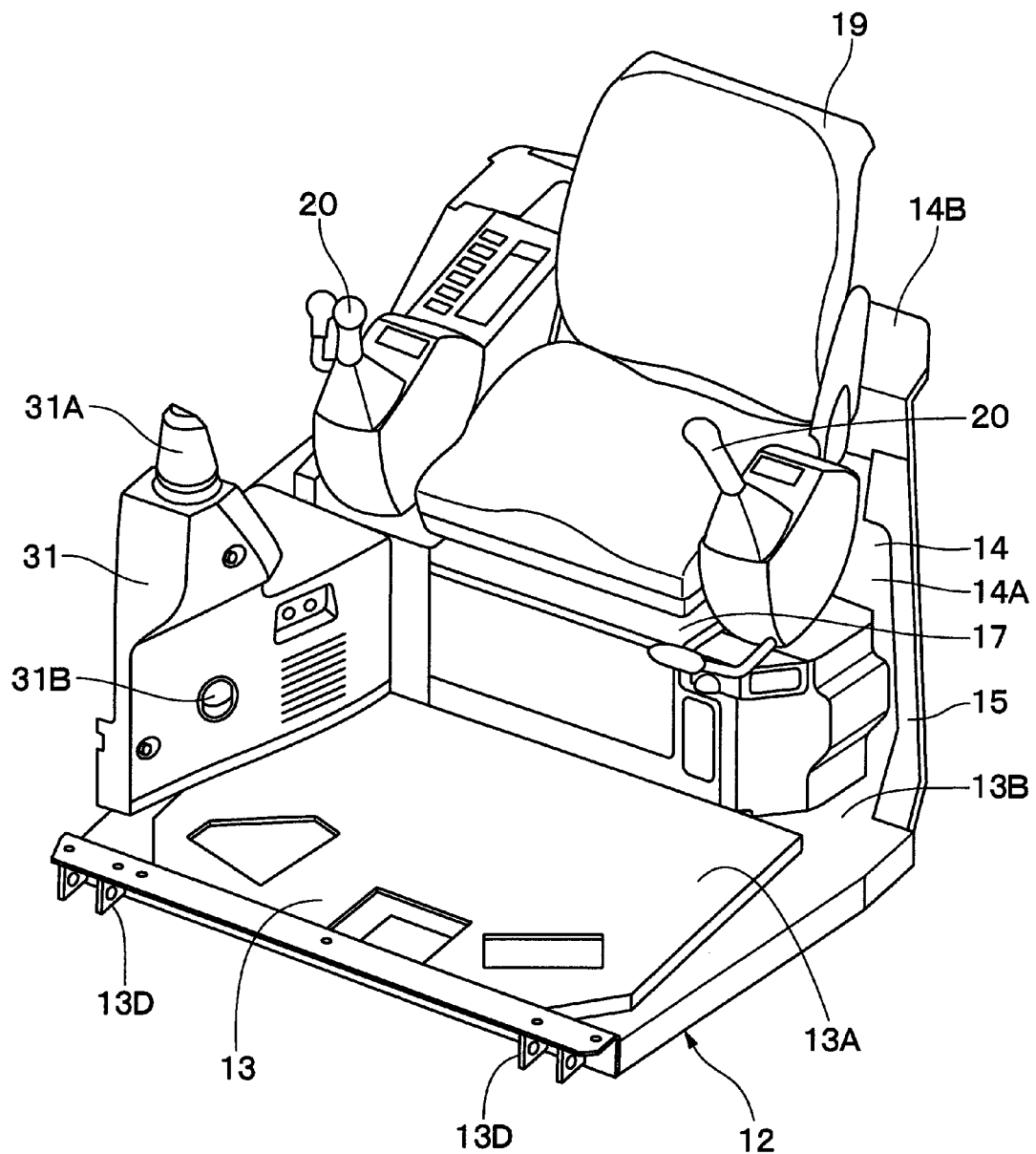
FIG. 6 is an enlarged perspective view of a floor member, seat support platform and operator's seat, taken obliquely from the front side.

In this instance, a couple of cab support members 5A are provided in transversely spaced positions at left front end portions of the revolving frame 5 (see FIGS. 2 and 5). These cab support members 5A are adapted to tiltably support pin mount brackets 13D of a floor panel 13 which forms part of a floor member 12, which will be described hereinafter. Further, the engine cooling fan 6A of the engine 6 is a suction type which is operative to take in external air and send it toward the engine 6. Besides, the cooling air from the engine cooling fan 6A is passed by the right side heat exchanger 8, around the engine 6, and along the rear side of the cab box 24. Finally, the cooling air is discharged to the outside.

Further, the exterior cover 10 is largely constituted by an engine cover 10A in a rear side, which is arranged to cover the engine 6, hydraulic pump 7 and heat exchanger 8 from upper side, and a tank cover 10B in a right side, which is arranged to cover the operating oil tanks 9. Moreover, as seen in FIG. 3, formed between a left side surface of the tank cover 10B and a right side surface of the cab 11 (of the floor member 12) is a narrow gap G which is narrow enough to prevent intrusion of dust and rainwater.

Now, shown in FIGS. 4 through 15 are details in construction of a cab 11 providing a dwelling space for an operator at the control of the machine.

Namely, indicated at 11 is a cab which is built on a left front portion of the revolving frame 5. This cab 11 defines a dwelling space for an operator who is seated for driving the vehicular lower structure 2 or for operating the working mechanism 4. The cab 11 is largely constituted by a floor member 12, seat support platform 17, operator's seat 19, air conditioner unit 25, cab box 24 and under floor duct 27, which will be described hereinafter.

Indicated at 12 is a floor member which forms a base of the cab 11, and this floor member 12 is attached to the lower side of the cab box 24, which will be described hereinafter, in such a way as to close the lower side of a dwelling space. As shown in FIGS. 6 through 13, the floor member 12 is formed by integrally joining and assembling together a floor panel 13 and a rear partition panel 14, which will be described hereinafter, by welding or other suitable means. Instead of resorting to a welding means, the floor member 12 may be formed, for example, by joining the floor panel 13 and rear partition panel 14, which are provided separately, together by the use of bolts if desired.

In this instance, the floor member 12 is supported on the revolving frame 5 through pin mount brackets 13D of the floor panel 13, described hereinafter, which are pivotally supported on the cab support members 5A to permit tilting of the floor member 12 up and down. Thus, the floor member 12 can be tilted up and down together with seat support platform 17, cab box 24, air conditioner unit 25 and under floor duct 27, which will be described hereinafter, taking a tilt-up position with its rear side with cab box 24 and so on turned up about fulcrum points at its front side as shown in FIG. 2 or a horizontal tilt-down position as shown in FIG. 1.

Figure 7:
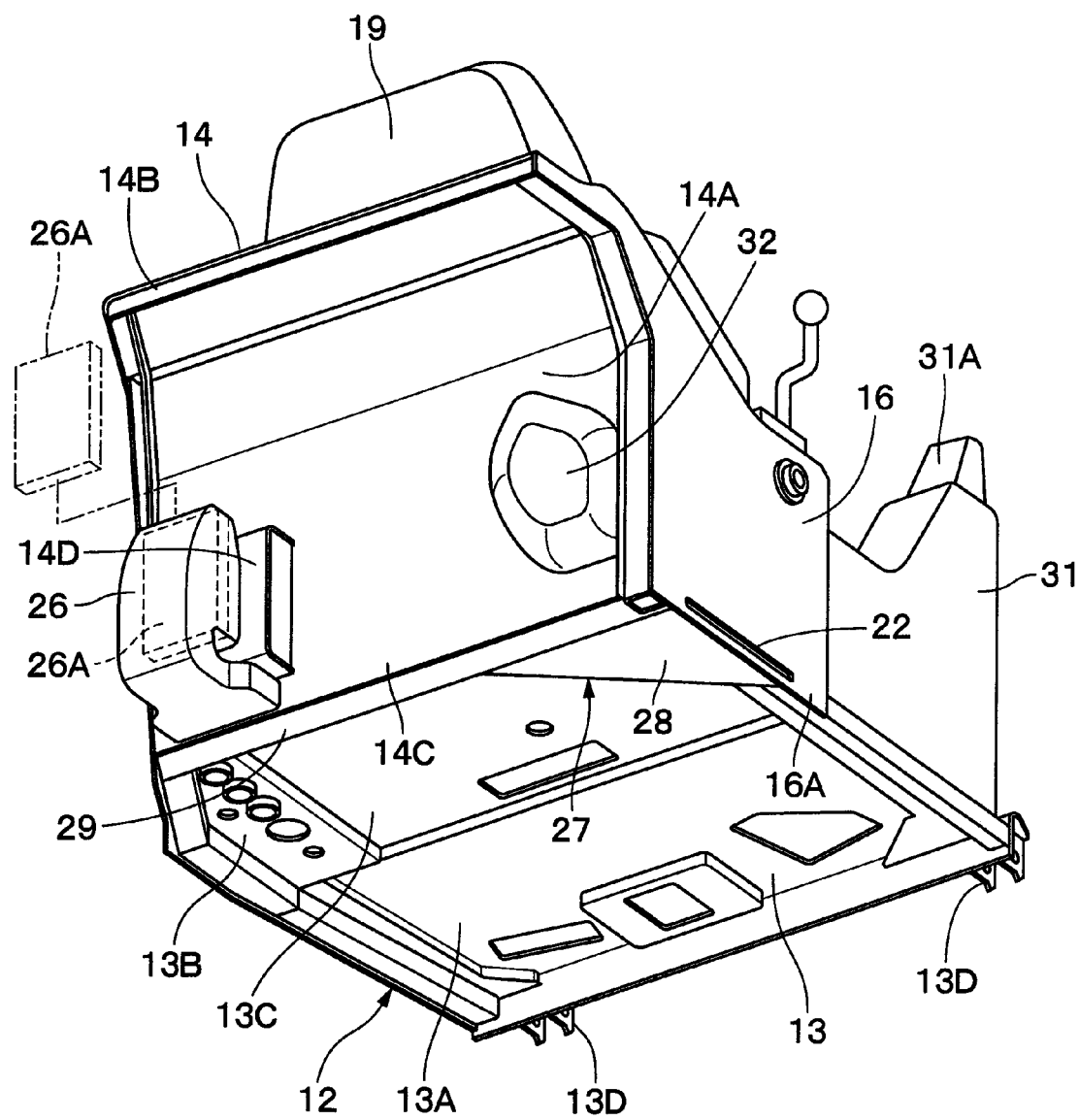
FIG. 7 is an enlarged perspective view of floor member and operator's seat, taken from rear side.
Figure 8:
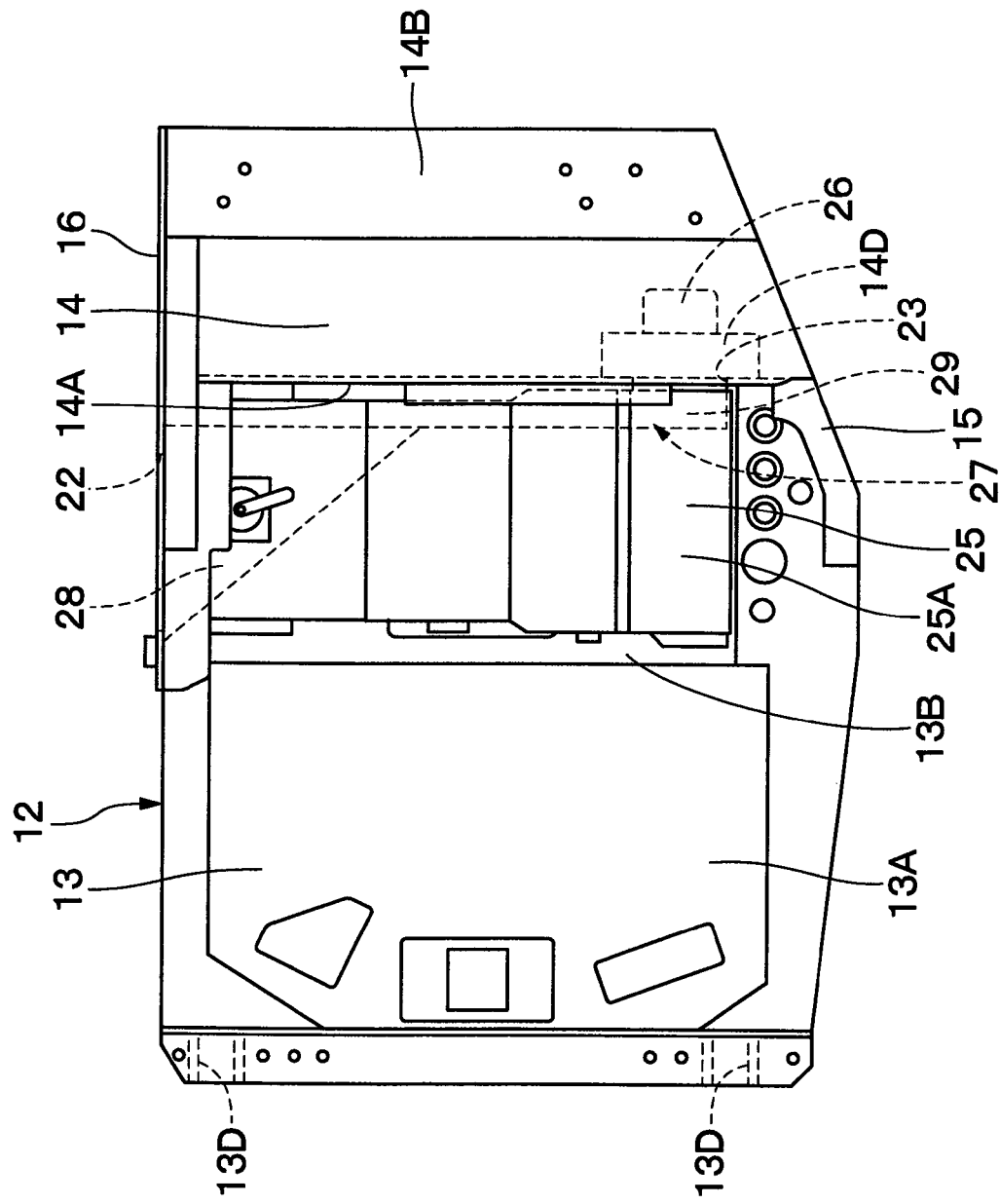
FIG. 8 is a schematic plan view of floor member and air conditioner unit, taken from upper side.
Figure 9:
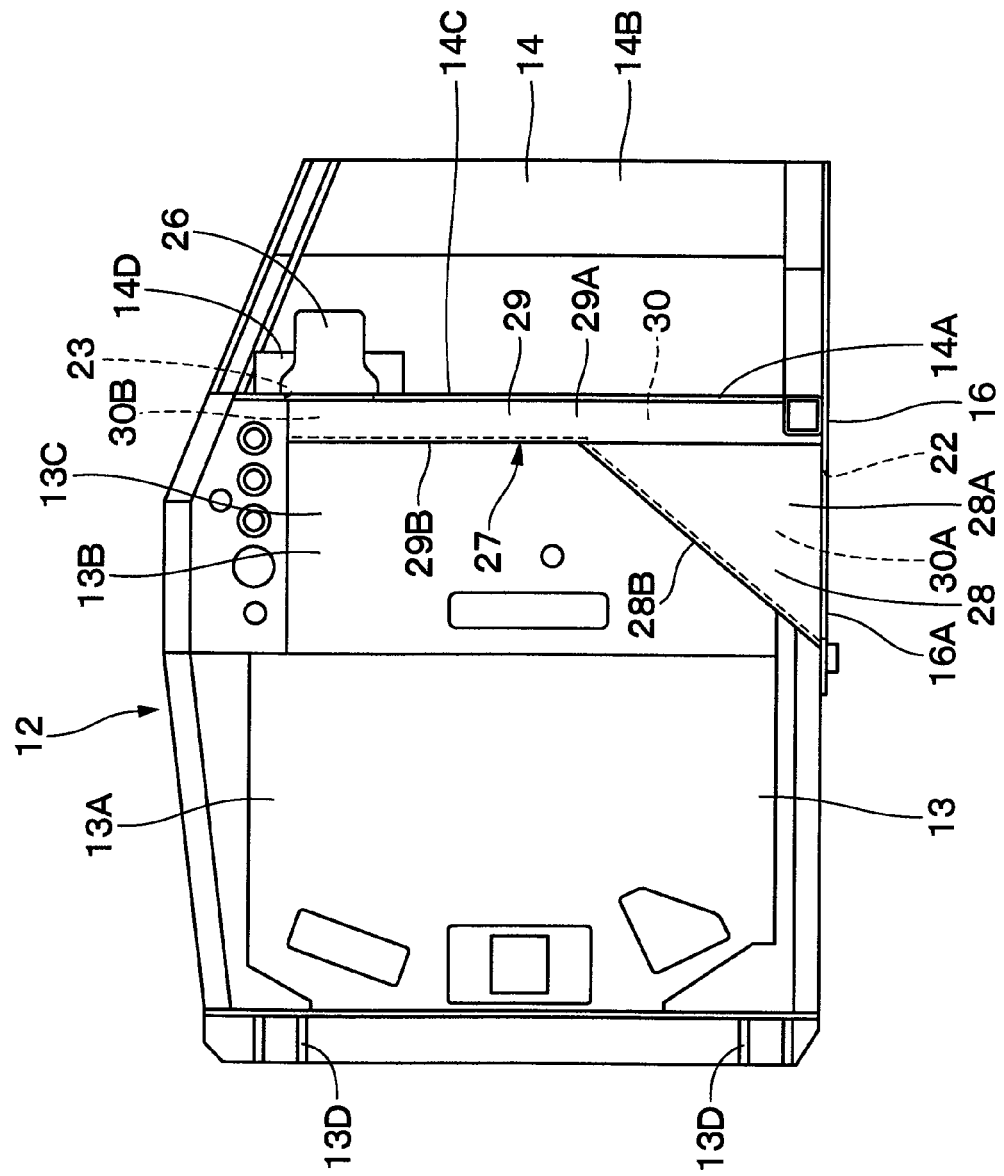
FIG. 9 is a schematic bottom view of floor member and under floor duct, taken from lower side.

Denoted at 13 is a floor panel which forms a base of the floor member 12. This floor panel 13 is substantially square in shape and located in a front side portion of the revolving frame 5. Further, foot rest areas 13A are provided on front side portions of the floor panel 13 for an operator who is seated on the operator's seat 19. On the other hand, equipments mount areas 13B are provided in rear side portions of the floor panel 13 for mounting thereon seat support platform 17, air conditioner unit 25 and the like as described later on. Attached to the lower side 13C of the equipments mount areas 13B is an under floor duct 27 as shown in FIG. 7.

Further, two pairs of pin mount brackets 13D are fixed estrangely from side by side at the front of the floor panel 13. As shown in FIG. 4, these pin mount brackets 13D are pivotally supported on the cab support members 5A on the side of the revolving frame 5.

Indicated at 14 is a rear partition panel which is provided on rear side portion of the front panel 13 and rises upward from the floor panel 13. This rear partition panel 14 is so arranged as to partition off the front and upper sides of the engine 6 when the floor member 12 is attached to the revolving frame 5. Thus, the rear partition panel 14 serves to shut off heat and noises from the engine 6 which would otherwise be transmitted to the cab box 24. Furthermore, the rear partition panel 14 is largely composed of a riser panel 14A which is arranged to rise from a rear end portion of the floor panel 13 in such a way as to cover the front side of the engine 6, and a transverse top panel 14B which is extended rearward from a top end of the riser panel 14A in such a way as to cover the top side of the engine 6.

Further, the riser panel 14A of the rear partition panel 14 is provided with a lower extension portion 14C which is extended downward beyond the lower side surface 13C of the floor panel 13. This lower extension portion 14C is provided with an external air outlet port 23 in a left side portion in the transverse direction, as described hereinafter. In this instance, the lower extension portion 14C of the rear partition panel 14 is so arranged as to form an external air induction passage 30 together with the lower side surface 13C of the equipment mount areas 13B of the floor panel 13 and an under floor duct 27, which will be described hereinafter.

Further, a connector box 14D is attached at a lower position in the left side of the riser panel member 14A, i.e., at a position adjacent to above-mentioned external air outlet port 23, in such a way as to project in a rearward direction. A filter fitting hole 14D1 is provided at the rear end of the connector box 14D, in a position adjacent to the external air outlet port 23. A filter accommodation case 26, which will be described hereinafter, is fitted in the filter fitting hole 14D1. Moreover, an external air intake port socket portion 14D2 is provided internally of the connector box 14D to receive an external air intake port 25H of the air conditioner unit 25. Thus, by way of the connector box 14D, the external air intake port 25H of the air conditioner unit 25 is held in communication with the filter accommodation case 26.

Indicated at 15 is a left-hand side panel which is provided at the left side of the floor member 12. This left-hand side panel 15 is constituted by a panel member substantially of a triangular shape, which is provided between the floor panel 13 and the riser panel 14A of the rear partition panel 14.

Figure 13:
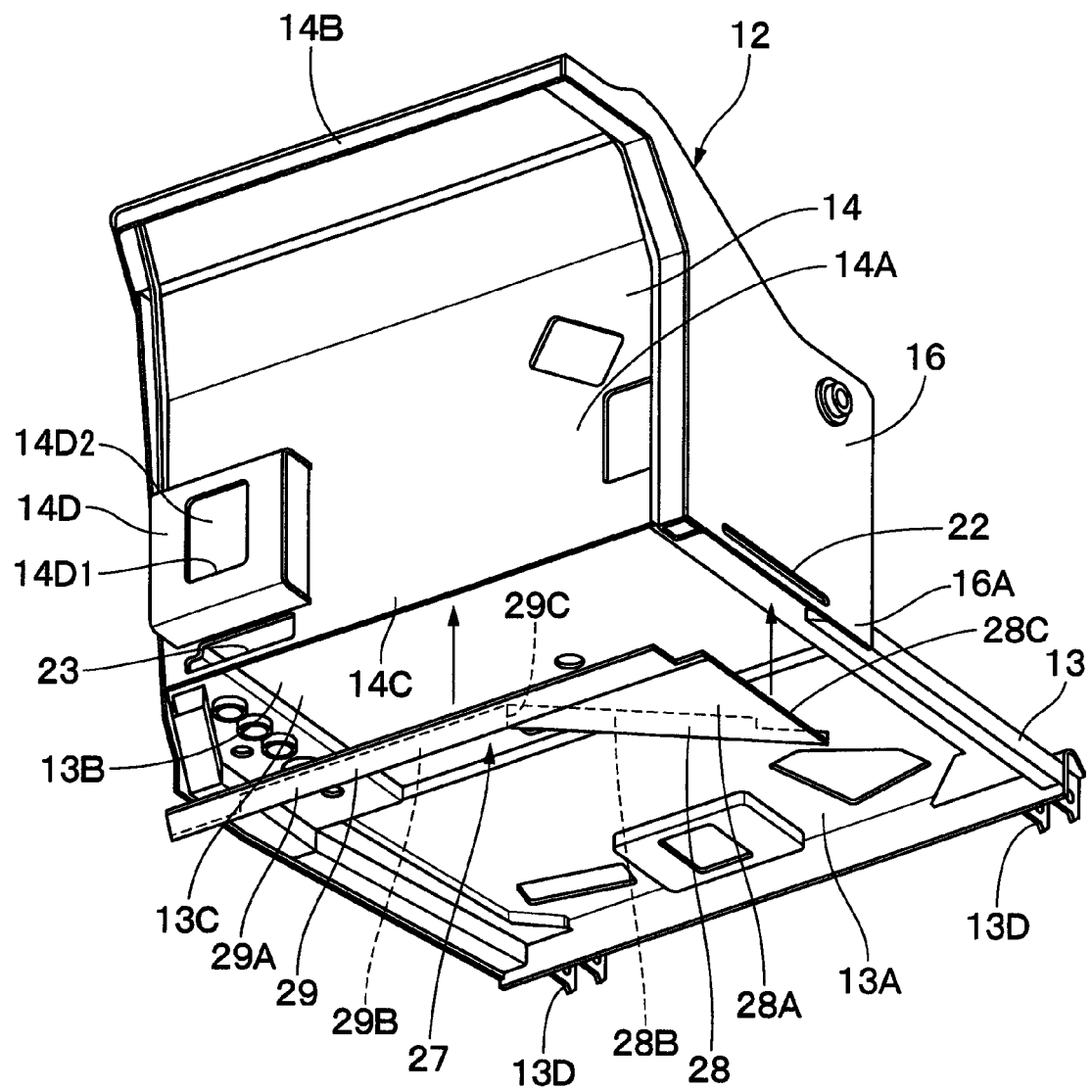
FIG. 13 is an exploded perspective view taken from lower side, showing the floor member along with an inclined duct plate and a straight duct plate in an exploded state.
Figure 15:
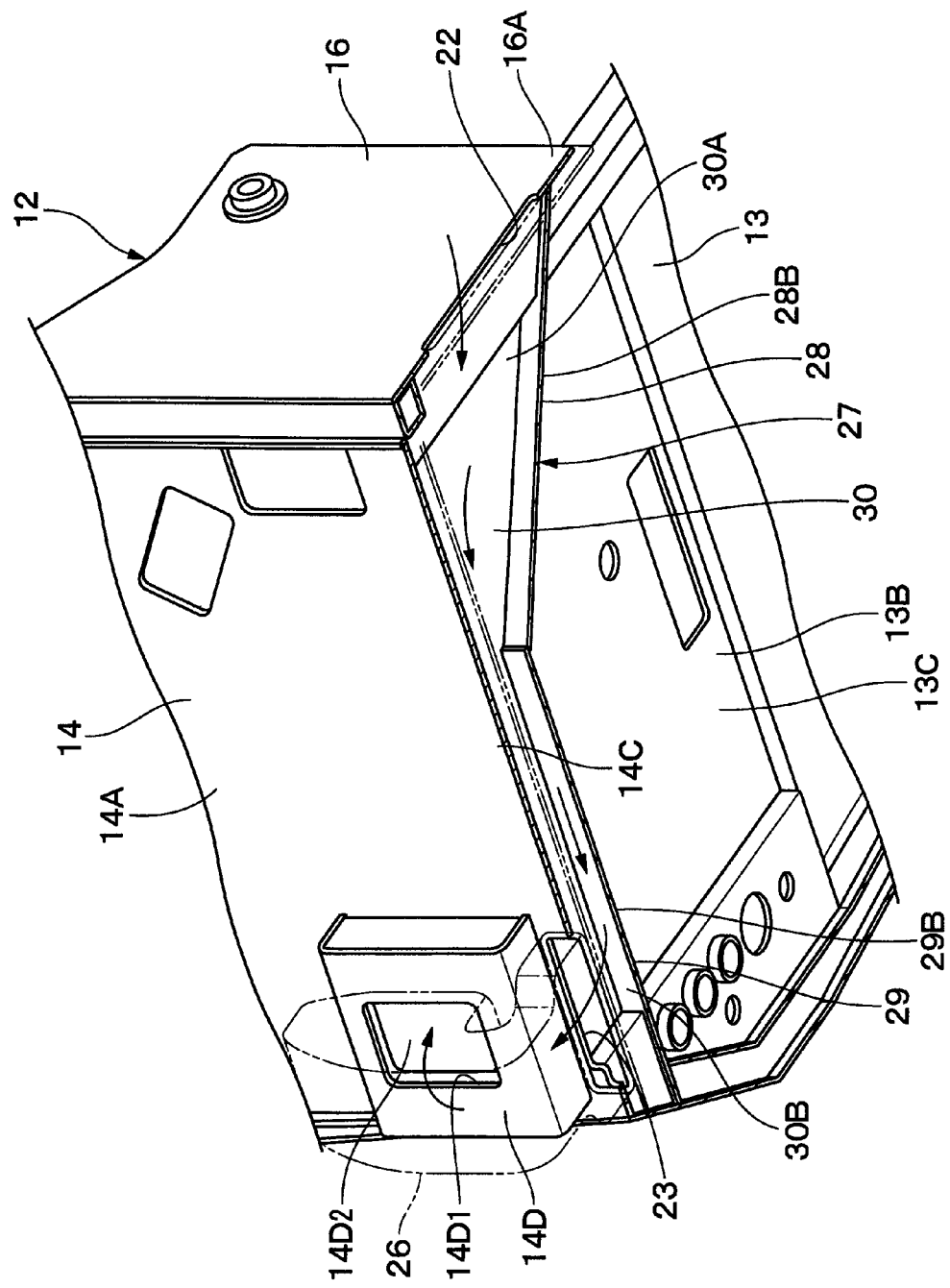
FIG. 15 is a sectioned perspective view on an enlarged scale, showing the external air induction passage by cutting off the under floor duct at the position of the external air inlet and the external air outlet.
Figure 16:
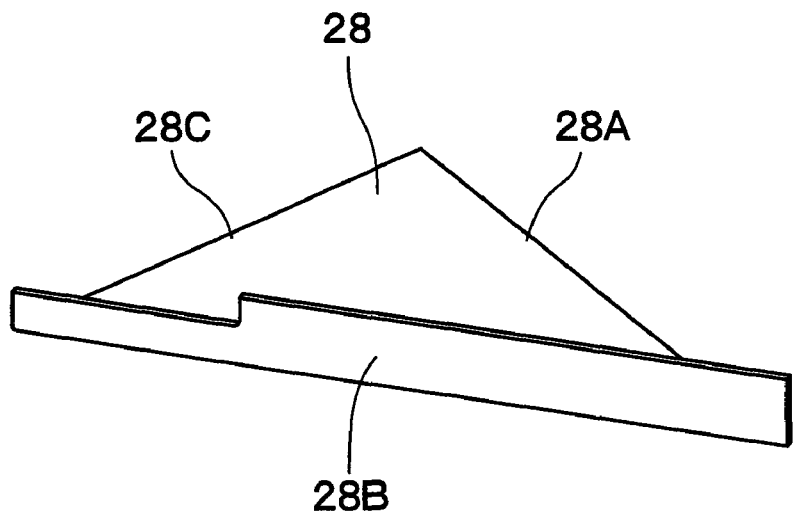
FIG. 16 is a schematic perspective view of the inclined duct plate alone, taken from upper side.
Figure 17:
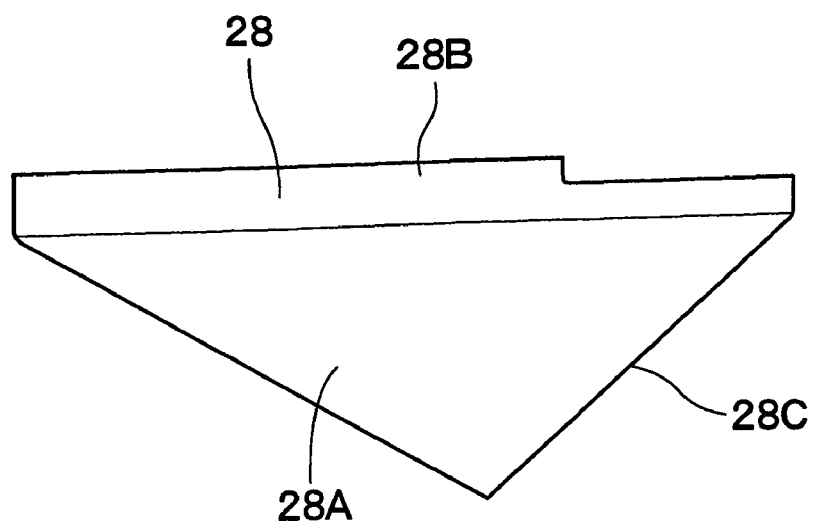
FIG. 17 is a schematic perspective view of the inclined duct plate alone, taken from lower side.
Figure 18:
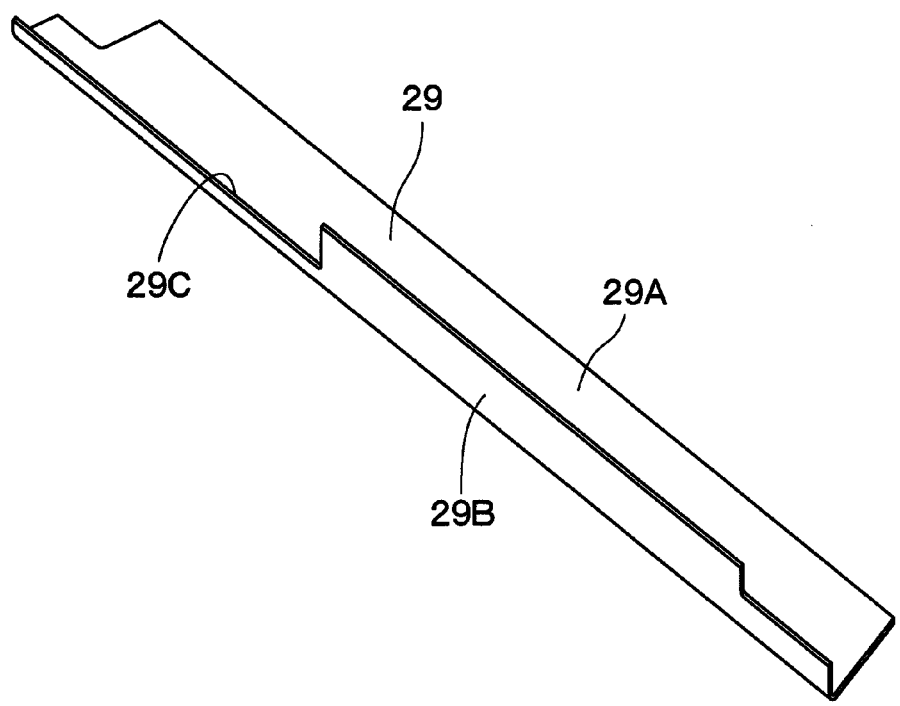
FIG. 18 is a schematic perspective view of the straight duct plate alone, taken from upper side.
Figure 19:
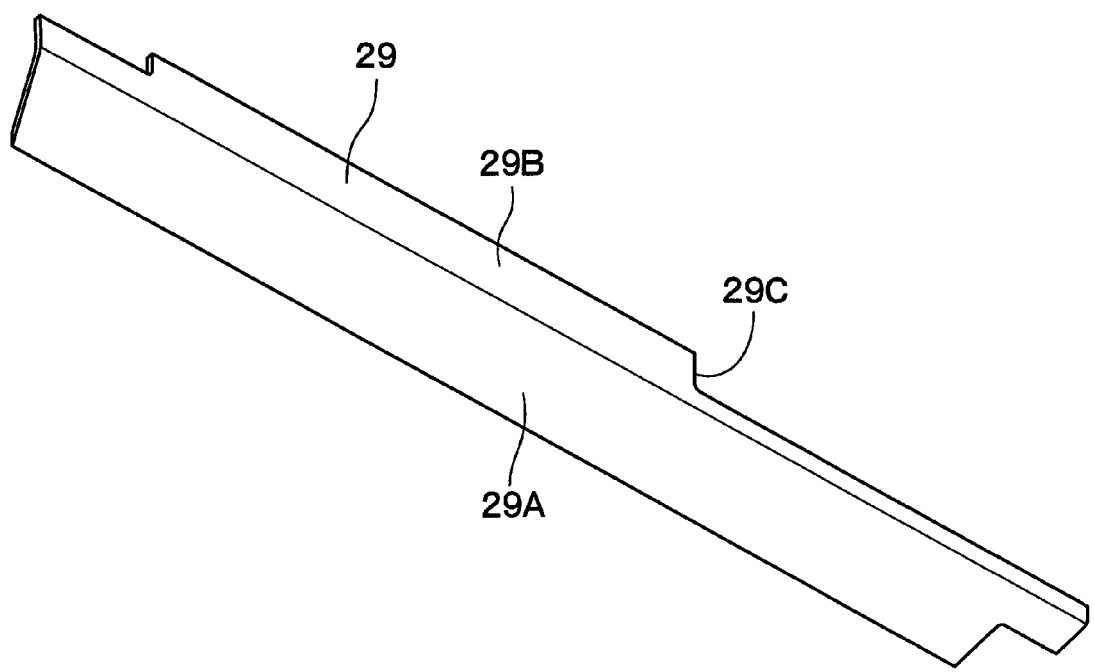
FIG. 19 is a schematic perspective view of the straight duct plate alone, taken from lower side.

Indicated at 16 is a right-hand side panel which is provided at the right side of the floor member 12. This right-hand side panel 16 is constituted by a panel member substantially of a square shape, which is provided between the floor panel 13 and the riser panel 14A of the rear partition panel 14. Further, as shown in FIGS. 13 and 15, the lower end of the right-hand side panel 16 is extended downward of the lower side surface 13C of the floor panel 13 to provide a right lower extension portion 16A, and an external air inlet port 22 is formed in the lower extension portion 16A as described hereinafter. Then, the lower extension portion 16A of the right-hand side panel 16 is arranged to define an external air induction passage 30, in cooperation with the above-mentioned lower extension portion 14C of the rear partition panel 14.

Indicated at 17 is a seat support platform which is provided on top of the floor panel 13. More specifically, this seat support platform 17 is provided on the upper side of the equipments mount area 13B in a rear side section of the floor panel 13. Further, for example, the seat support platform 17 is formed by bending a steel plate into a gate-like shape, and an operator's seat 19 which will be described hereinafter, is provided on the upper side surface.

Indicated at 18 is an air conditioner unit accommodation room which is defined internally of the seat support platform 17 in the upper side of the equipment mount area 13B of the floor panel 13. An air conditioner unit 25 is fitted in this air conditioner unit accommodation room 18 as described hereinafter.

Indicated at 19 is an operator's seat which is mounted on the seat support platform 17. This operator's seat 19 is taken by an operator at the control of the hydraulic excavator 1. Further, control levers 20 and so on are provided on the right and left sides of the operator's seat 19 thereby to operate the working mechanism 4. On the other hand, located on the front side of the foot rest area 13A of the floor panel 13 are vehicle drive control levers and pedals 21 to be operated by an operator who is seated on the operator's seat 19, at the time of driving the vehicular lower structure 2.

Denoted at 22 is an external air inlet port which is provided in a lower end portion of the right-hand side panel 16 of the floor member 12. Namely, the external air inlet port 22 is provided in the lower extension portion 16A of the right-hand side panel 16 at the opposite side away from the entrance way 24F of the cab box 24. As shown in FIG. 15, the external air inlet port 22 is formed in the shape of a slot which is elongated in forward and rearward directions to take external air into the external air induction passage 30, which will be described hereinafter. Then, an inflow opening 30A at an inflow end of the external air induction passage 30 is connected to the external air inlet port 22.

In this instance, as shown in FIG. 3, the external air inlet port 22 is opened into a gap space G between the right-hand side panel 16 of the floor member 12 and the tank cover 10B of the exterior cover 10. This gap space G is located at a distant position from the position from the engine 6 and shielded from the engine 6 by the rear partition panel 14, so that the eternal air inlet port 22 can take in cool air from outside, precluding possibilities of taking heated air from the side of the engine 6. Further, the external air inlet port 22 is located to confront a left side surface of the tank cover 10B with the small gap G, so that it can take in clean air from outside, lessening possibilities of intrusion of dust or rainwater.

Indicated at 23 is an external air outlet port which is provided in the lower extension portion 14C of the rear partition panel 14 of the floor member 12. This external air outlet port 23 is formed in the shape of a slot which is elongated in the transverse direction. Then, an outflow opening 30B of the external air induction passage 30 is connected to the external air outlet port 23 through the filter accommodation case 26, which will be described hereinafter.

Denoted at 24 is a cab box which is mounted on the floor member 12 in a left side section of the revolving frame 5 (see FIG. 5). This cab box 24 defines a dwelling space around and over the operator's seat 19 for an operator to operate the machine. More particularly, the cab box 24 is formed in a box-like shape by front face portion 24A, rear face portion 24B, left side face portion 24C, right side face portion 24D, and ceiling portion 24E. An entrance way 24F is formed in the left side face portion 24C as a passage to or from the dwelling space, and a door 24G is openably fitted in the entrance way 24F (as shown in FIG. 1).

Figure 10:
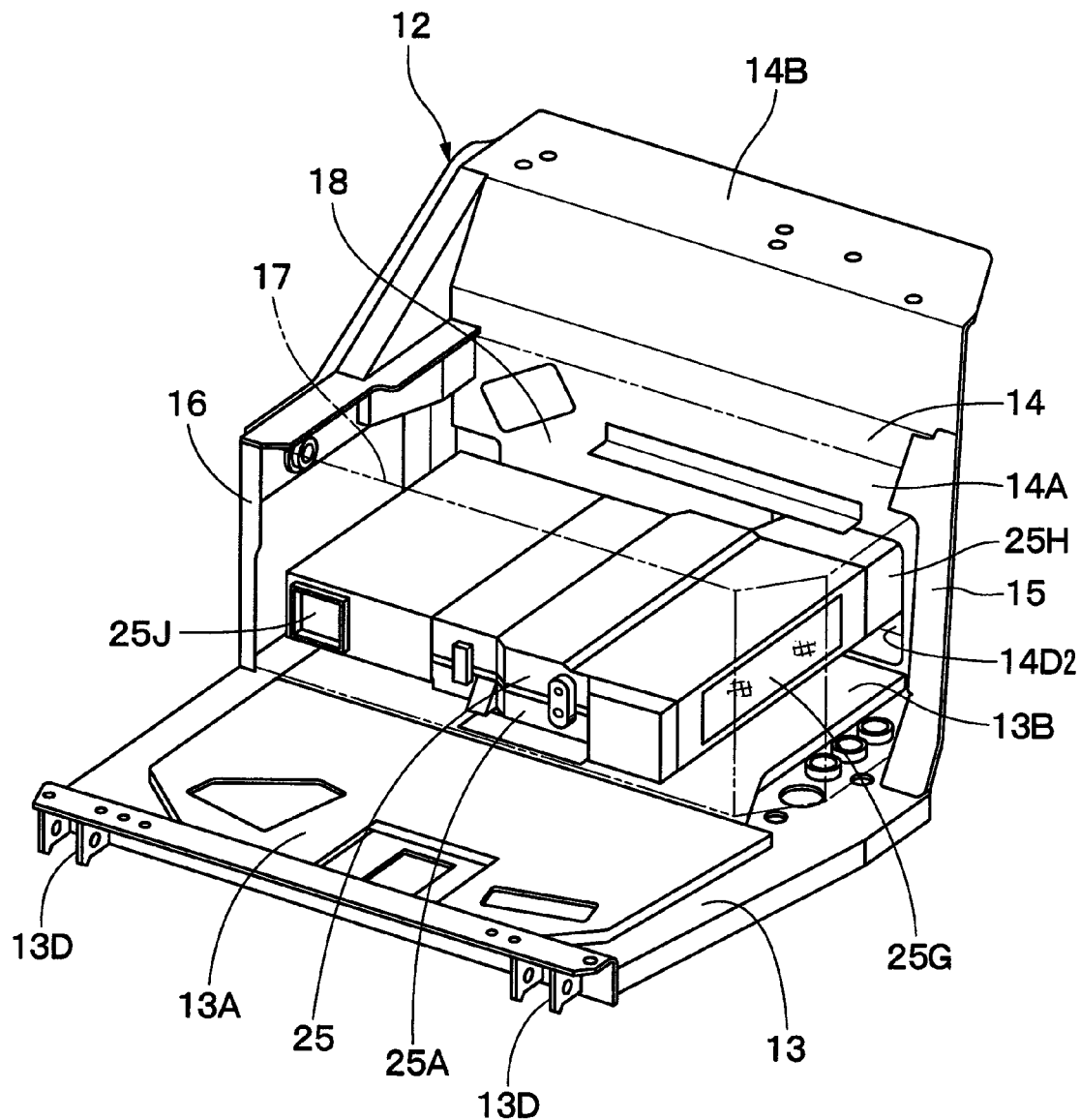
FIG. 10 is a schematic perspective view of floor member and air conditioner unit from the same position as FIG. 6, with the operator's seat removed.
Figure 11:
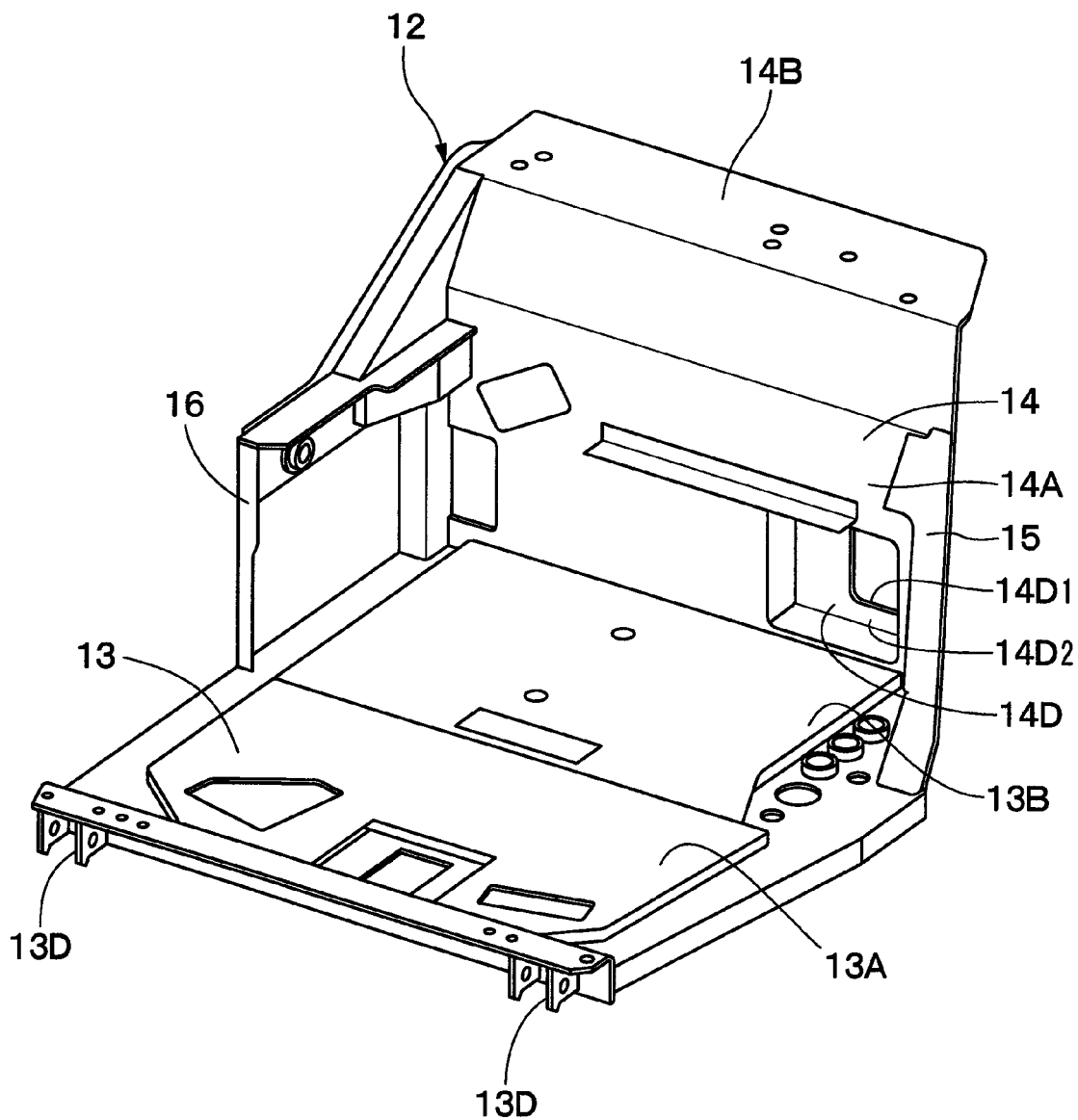
FIG. 11 is a schematic perspective view of floor member of FIG. 10 alone.

Indicated at 25 is an air conditioner unit serving as an indoor unit (shown in FIG. 10). This air conditioner unit 25 is mounted on the equipments mount area 13B of the floor panel 13, internally of the air conditioner unit accommodation room 18 which is defined between the seat support platform 17 and the floor panel 13. Further, the air conditioner unit 25 constitutes an air conditioning system jointly and cooperatively with outdoor unit or units such as compressor and condenser (both of them are not shown) which are mounted on the side of the engine 6. The air conditioner unit 25 plays a role of conditioning the air which is taken in, for example, through the external air induction passage 30, and delivering the conditioned cool or warm air to the cab 11.

Figure 14:
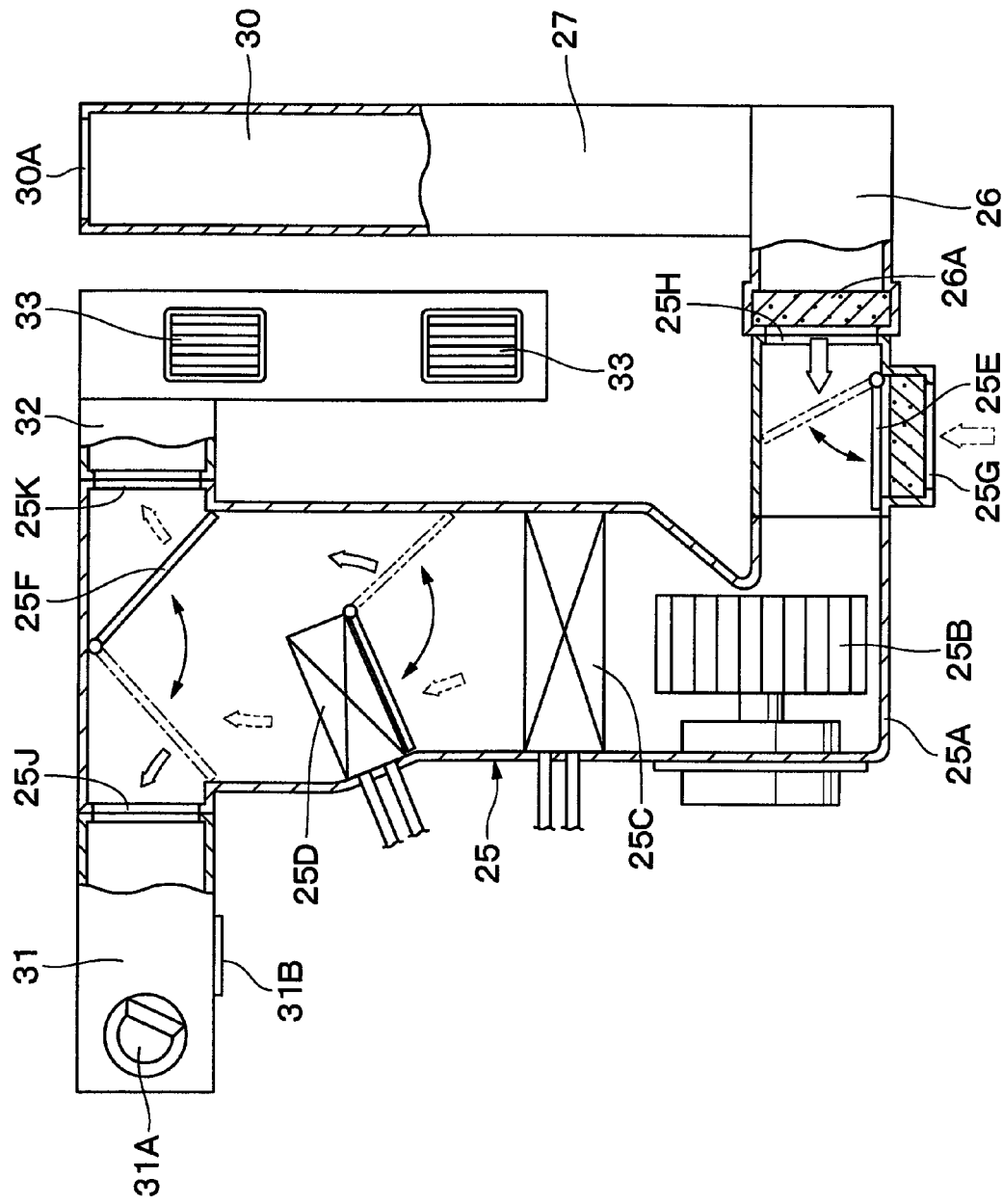
FIG. 14 is a schematic view of air conditioner unit, external air induction passage and filter accommodation case, showing flow paths of air.

As shown in FIG. 14, the air conditioner unit 25 is provided with a transversely oriented box-like main casing 25A, and a blower fan 25B, evaporator 25C, heater core 25D, internal/external switch member 25E, and air outlet switch member 25F and so on are accommodated the main casing 25A. Further, an internal air inlet port 25G is provided in a left-hand side wall of the casing 25A to take in air in the cab box 24 (internal air). In addition, the external air intake port 25H which is provided at the rear face in a left side portion of the main casing 25A, and the external air intake port 25H is projected rearward into the external air intake port socket portion 14D2 of the connector box 14 which provides the rear partition panel 14 and connected to the filter accommodation case 26.

On the other hand, in the right side, the main casing 25A is provided with front supply port 25J and rear supply port 25K to supply conditioned air therethrough. The front supply port 25J supplies conditioned air to air outlets 31A and 31B in a duct cover 31 which is located in a front side section of the cab 11 as described hereinafter. Further, the rear supply port 25K supplies conditioned air to a rear air outlet 33 which is located in a rear side section of the cab 11, through an external duct 32 which will be described hereinafter.

The air conditioner unit 25 sifts the internal/external switch member 25E by rotationally driving the blower fan 25B. Consequently, the air conditioner unit 25 takes internal air in the cab box 24 through the internal air inlet port 25G or takes external air from the external air intake port 25H through the external air induction passage 30 and filter accommodation case 26 as described hereinafter. Then, these airs are cooled down at the evaporator 25C in the main casing 25A or warmed by the heater core 25D to make conditioned air. On the other hand, the conditioning air outlet switch member 25F keeps the temperature in the cab box 24 at an appropriate level by the supply port 25J or 25K, and spouts out conditioned air to the cab box 24.

Then, indicated at 26 is a filter accommodation case which is provided between the external air outlet port 23 and the filter fitting hole 14D1 of the connector box 14D of the rear partition panel 14. This filter accommodation case 26 is adapted to hold an external air filter 26A, and the external air filter 26A removes dust from external air which is taken in through the external air induction passage 30, for supplying clean air to the cab 11.

Now, referring to FIGS. 4, 9, 12 to 19, an under floor duct 27 of the floor member 12 is provided to form the external air induction passage 30 which guides external air toward the air conditioner unit 25, in the manner as described below.

Indicated at 27 is an under floor duct which is provided on the lower side surface 13C of the floor panel 13 of the floor member 12. This under floor duct 27 is composed of an inclined duct plate 28 and a straight duct plate 29, which will be described hereinafter, for directing external air from outside the cab box 24 (external air) toward the external air intake port 25H on the intake side of the air conditioner unit 25. Then, the under floor duct 27 is located on the side of the lower side surface 13C of the floor panel 13 of the floor member 12, and arranged to combine the lower extension portion 14C of the rear partition panel 14 and the lower extensions 16A of the right-hand side panel 16 in such away as to form the external air induction passage 30 which is in a square tubular shape as a whole.

Indicated at 28 is an inclined duct plate, namely, a duct forming member which forms an upstream side of the under floor duct 27. This inclined duct plate 28 is composed of a triangular bottom plate 28A which is disposed face to face and in small gap relation with the lower side surface 13C of the floor panel 13 in a right corner portion between the right-hand side panel 16 and rear partition panel 14, and a riser panel 28B which rises upward with bending and along the long hypotenuse side of the triangular bottom plate 28A.

Further, the side of the bottom plate 28A which faces toward the external air inlet 22 is provided with a straight air intake end 28C.

In this instance, the inclined duct plate 28 can be easily formed, for example, by bending a blank metal plate of a predetermined shape for only one time. Besides, the inclined duct plate 28 can be integrally attached to the floor panel 13 and right-hand side panel 16 of the floor member 12 by welding or other fixation means, in such a way as to enhance the strength of the floor panel 13 of the floor member 12 by forming a reinforced three-dimensional structure.

Indicated at 29 is a straight duct plate serving as a duct forming member which forms a downstream side of the under floor duct 27. This straight duct plate 29 is constituted by a bottom plate 29A which is located on the front side of the lower extension portion 14C of the rear partition panel 14 and confronted the lower side surface 13C of the floor panel 13 with a gap space, and a riser panel 29B in the form of an elongated frame structure of L-shape which rises upward at and along the front side of the bottom plate 29A with bending and confronted the lower extension portion 14C of the rear portion plate 14 with a gap space. Further, the midway of the riser panel 29B is provided as a notched opening 29C, and the notched opening 29C is connected to the riser panel 28B of the inclined duct plate 28.

Then, similarly to the incline duct plate 28 described above, the straight duct plate 29 can be formed easily by bending a blank metal plate for only one time. Further, by integrally welding to the floor panel 13 of the floor member 12 and the rear partition panel 14, the straight duct plate 29 contributes to form the strength of the floor panel 13 of the floor member 12 into a reinforced three-dimensional structure.

Denoted at 30 is an external air induction passage which is formed jointly by the floor member 12 and the under floor duct 27. As shown in FIG. 15, this external air induction passage 30 is formed in such a way as to circulate external air from the external air inlet port 22 toward the external air outlet port 23 by integrally attaching the under floor duct 27 to the floor member 12. Further, an inflow opening 30A at an upstream end of the external air induction passage 30 is connected to the external air inlet port 22, while an outflow opening 30B at a downstream end is connected to the external air outlet port 23.

In this instance, the under floor duct 27 is constituted by the inclined duct plate 28 and straight duct plate 29, and the external air induction passage 30 is formed through utilization of the under floor duct 27 and part of the floor member 12. Namely, the external air induction passage 30 can be formed in a compact form on the lower surface 13C of the floor panel 13 by utilizing the lower surface 13C of the floor panel 13, lower extension portion 14C of the rear partition panel 14 and lower extension 16A of the right-hand side panel 16 of the floor member 12, in combination with the under floor duct 27. Besides, the external air induction passage 30 can be formed in such a way not to protrude on the lower side of the floor member 12.

Further, in a case where the air conditioner unit 25 is of a high output type, one may face a situation where the air intake ports 25G and 25H are located at a large distance from the supply port 25J and 25K of the air conditioner unit 25. In such a case, even if the external air intake port 25H of the air conditioner unit 25 is located at the left side of the cab 11, the external air inlet port 22 of the external air induction passage 30 can be communicated with the gap space G on the right side of the cab 11.

Furthermore, the reference numeral 31 denotes a duct cover (see FIG. 5) which is located in a right front side of the cab box 24. A front upward air outlet port 31A is provided on the upper side of the duct cover 31 to blow out conditioned air toward an operator who is seated on the operator's seat 19. Further, a front downward air outlet port 31B is provided at a lateral side of the duct cover 31 to blow out conditioned air toward feet of the seated operator. These air outlets 31A and 31B are connected to the front supply port 25J of the air conditioner unit 25.

Figure 12:
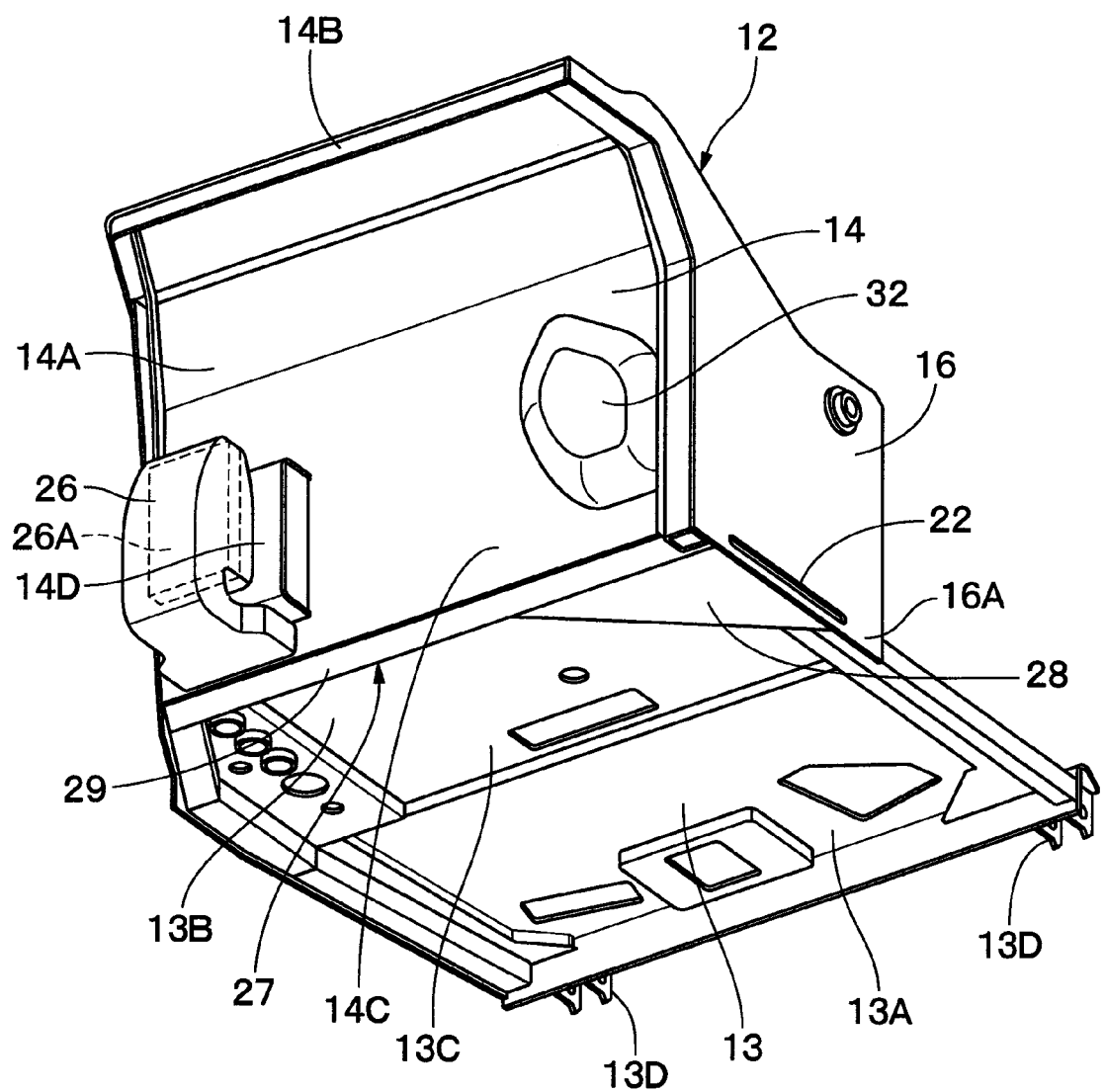
FIG. 12 is a schematic perspective view taken from the lower side of the floor member, showing the floor member along with the under floor duct and filter accommodation case.

On the other hand, indicated at 32 is an external duct which is provided at a rear face in a right side portion of the riser panel 14A of the rear partition panel 14 (see FIGS. 12, 14 and 15). This external duct 32 serves to supply conditioned air, for example, to a rear air outlet port 33 on the transverse top panel 14B.

According to the present embodiment, the hydraulic excavator 1 is arranged as described above, and the air conditioner unit 25 and under floor duct 27 are assembled with the floor member 12 in the order as follows.

In the first place, for the purpose of assembling the under floor duct 27 which supplies cool and clean air to the air conditioner unit 25, the inclined duct plate 28 and straight duct plate 29 of the under floor duct 27 are fixed on the lower side surface 13C of the floor panel 13 in such a way as to connect the external air inlet port 22 with the external air outlet port 23. By so doing, the external air induction passage 30 is formed by the use of part of the under floor duct 27, the floor panel 13 of the floor member 12, rear partition panel 14 and right-hand side panel 16.

Now, the hydraulic excavator 1 is put in operation in the manner as follows. An operator gets into the cab 11 and is seated on the operator's seat 19. Then, the vehicle drive control levers and pedals 21 are operated by an operator who is seated on the operator's seat 19, thereby driving the vehicular lower structure 2 to put the hydraulic excavator 1 in travel as far as a target working site. On a working site, by way of the right and left control levers 20, the working mechanism 4 is lifted up and down to carry out, for example, a ground excavating operation.

On the other hand, on a working site as mentioned above, the air conditioner unit 25 is turned on to blow out conditioned air from the air conditioner unit 25 through the air outlets port 31A, 31B and the rear air outlet port 33 of the dust cover 31 and the temperature in the dwelling space of the cab 11 is comfortable to the operator.

Further, at the time of carrying out an inspection or repair work on equipment which is mounted on the revolving frame 5, the cab 11 is tilted up by turning the rear end of the can 11 upward about fulcrum points on the cab support members 5A at the front of the revolving frame 5. In this instance, one can make an access to the engine 6, hydraulic pump 7, heat exchanger 8 or other equipments which are mounted on the revolving frame 5 and carry out a necessary inspection or repair work without being obstructed by the cab 11. Upon completion of a work, the cab 11 is tilted down onto the revolving frame 5, by turning the rear end of the cab 11 downward about the fulcrum points on the cab support member 5A.

In this manner, according to the present embodiment, the under floor duct 27 is provided on the lower side surface 13C of the floor panel 13 of floor member 12 in such a way to form the external air induction passage 30 thereby to guide external air from outside the cab 11 toward the air conditioner unit 25. That is to say, the under floor duct 27 is formed by effectively utilizing a space under the lower side surface 13C of the floor panel 13. In addition, the under floor duct 27 can be extended as far as an arbitrary position within the limits of the equipments mount area 13B of the floor panel 13, so that the external air inlet port 22 can be opened at a distant position from the engine 6, i.e., at a position in the gap G to take in clean and cool air relatively free of dust.

As a result, even in the case of a small hydraulic excavator 1 having onboard equipments packed in a limited space, the under floor duct 27 can be provided almost as an integral part of the floor member 12. By so doing, the under floor duct 27 can supply clean and cool external air to the air conditioner unit 25 to enhance the cooling efficiency of the air conditioner unit 25 in keeping the working environment in the dwelling space internally of the cab box 24 in comfortable conditions. Besides, it becomes possible to reduce the frequency of cleaning the external air filter 26A of the filter accommodation case 26 and to prolong the service life of the filter 26A.

Further, the extension of the outlet end of the under floor duct 27 as far as the left side of the floor member 12 gives a greater freedom in design in determining the position of the external air intake port 25H of the air conditioner unit 25. Accordingly, one can afford a greater freedom in design in installing the air conditioner unit 25 in the air conditioner unit accommodation room 18.

Furthermore, the filter accommodation case 26 is located in a position between the external air outlet port 23 and the filter mount opening 14D1 on the connector box 14D of the rear partition panel 14, and this filter accommodation case 26 is provided with an eternal air filter 26A to remove dust from intake external air to be led to the air conditioner unit 25. Thus, the external air filter 26A which is accommodated in the filter accommodation case 26 can be replaced from the rear side of the rear partition panel 14 (the floor member 12), facilitating cleaning and replacement of the external air filter 26A.

On the other hand, the inclined duct plate 28 of the under floor duct 27 is welded to the lower side surface 13C of the floor panel 13 and the right-hand side plate 16, while the straight duct plate 29 is welded to the lower side surface 13C of the floor panel 13 and the rear partition panel 14. Thus, in combination with the under floor duct 27, the floor member 12 can be formed into the reinforced three-dimensional floor panel 13 and increase the strength of the floor member 12. In addition, it becomes possible to perform an assembling work efficiently by the use of a subassembly, which has been prepared in advance by preassembling the under floor duct 27 with the floor member 12.

Moreover, each one of the inclined duct plate 28 and straight duct plate 29 of the under floor duct 27 can be formed easily by a simple bending operation on a blank metal plate. Besides, the inclined duct plate 28 and the straight duct plate 29 can be easily attached to the floor member 12 by welding or other fixation means. Thus, the under floor duct 27 can be formed in a very easy manner by simple parts.

Further, the cab 11 can be tilted up and down about the fulcrum points on the cab support members 5A together with the floor member 12, air conditioner unit 25 and under floor duct 27. That is to say, the floor panel 27 can be tilted toward and away from the revolving frame 5 without obstruction by the under floor duct 27 to facilitate inspection and maintenance and service of various onboard equipments and cleaning and replacements of the filter unit in the filter accommodation case 26.

Figure 20:
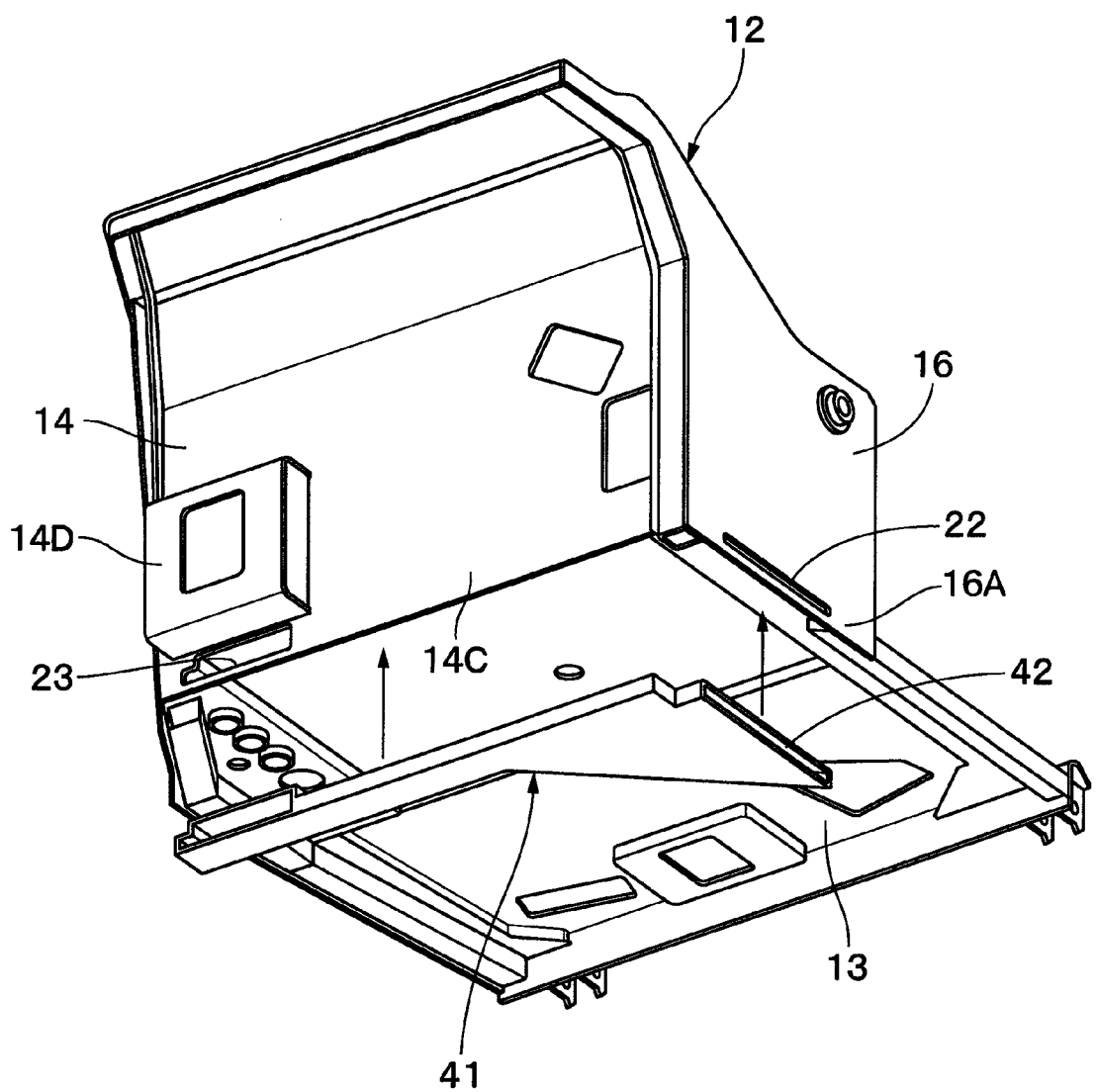
FIG. 20 is an exploded perspective view in the same position as FIG. 13, showing an under floor duct in a modification of the present invention along with a floor member.

Furthermore, in the above-described embodiment, by way of example the external air induction passage 30 is formed by attaching the under floor duct 27 to the lower surface 13C of the floor panel 13 of the floor member 12. However, the present invention is not limited to this particular example. For instance, as in a modification shown in FIG. 20, there may be employed an under floor duct 41 of a flattened tubular structure internally defining an external air induction passage 42. This under floor duct 41 is attached integrally to the lower surface 13C of the floor panel 13 in such a way to connect the external air inlet port 22 and the external air outlet port 23. In this case, the external air induction passage 42 can be formed by the use of a subassembly of the under floor duct 41 with the floor member 12.

Further, in the above-described embodiment, with a view to simplifying bending operations, by way of example the under floor duct 27 is composed of two parts, i.e., the inclined duct plate 28 and the straight duct plate 29. However, the present invention is not limited to this particular example. For instance, if desired, the under floor duct 27 may be formed by the use of a single metal plate or by the use of three or more metal plates.

On the other hand, in the above-described embodiment, by way of example the under floor duct 27 which is formed of metal plates is adapted to serve also as a reinforcing member for enhancing the strength of the floor member 12. However, if desired, the under floor duct 27 may be formed of plastics or the like.

Further, in the above-described embodiment, by way of example the cab 11 is mounted on the revolving frame 5 tiltably about fulcrum points at the front side, to assume a tilt-up position or a tilt-down position. However, the present invention is not limited to this particular example. If desired, the cab 11 may be fixedly mounted on the revolving frame 5.

Furthermore, in the above-described embodiment, by way of example the present invention is applied to a crawler type hydraulic excavator 1 having air conditioner unit 25 in the cab 11 as a typical of construction machines. However, needless to say, the present invention can be similarly applied to other construction machines including wheel type hydraulic excavators, wheel loaders and lift trucks which are having an air conditioner unit 25 in the cab 11.

The invention claimed is:

1. A construction machine, having a vehicular lower structure, and an upper revolving structure swingably mounted on said vehicular lower structure, having a cab mounted on a front side of a revolving frame which constitutes a sturdy support structure;
   said cab being composed of a floor member mounted on said revolving frame and including a floor panel, a right-hand side panel located at a right side of said floor panel and a rear partition panel located in a rear side section of said floor panel, a seat support platform mounted on said floor panel of said floor member to support thereon an operator's seat to be taken by an operator, said seat support platform internally defining an air conditioner unit accommodation space, a cab box built on said floor member to define an operator's dwelling space around said operator's seat and provided with an entrance way in left one of right and left side faces, and an air conditioner unit installed in said air conditioner unit accommodation space to condition intake air and to supply conditioned air to said cab box, characterized in that:
   an under floor duct is provided on the lower side surface of said floor panel of said floor member to form an external air induction passage to supply external air to said air conditioner unit from outside said cab;
   an external air inlet port being provided in a lower portion of a right-hand side panel of said floor member, at the opposite side from said entrance way of said cab box, to let external air flow into said under floor duct; and an external air outlet port being provided in a lower portion of a rear partition panel of said floor member, to let external air flow out from said under floor duct to said air conditioner unit.

2. A construction machine as defined in claim 1, wherein a filter fitting hole is provided at a rear side surface of said floor member adjacently to said external air outlet port, and a filter accommodation case which accommodates a filter is interposed between said external air outlet port and said filter fitting hole to remove dust from external air to be supplied to said air conditioner unit.

3. A construction machine as defined in claim 1, wherein said floor panel of said floor member is arranged to provide a foot rest area in an upper front section for an operator and to provide an equipments mount area in an upper rear section for mounting said seat support platform and air conditioner unit thereon; and said under floor duct being attached to a lower side surface of said equipments mount area of said floor member.

4. A construction machine as defined in claim 1, wherein said rear partition panel of said floor member is provided with a lower extension portion at a rear side, which lower extension portion being extended downward from said floor panel, and said external air induction passage is formed by the combination of the lower side surface of said floor panel, said lower extension portion and said under floor duct which is formed into a frame structure.

5. A construction machine as defined in claim 1, wherein said air conditioner unit is provided with a transversely extending main casing to accommodate therein a blower fan, evaporator, heater core and internal/external switch member, said main casing being provided with an internal air intake port at one lateral side to take in air in said cab as internal air, said main casing being provided with an external air inlet port at rear face to take in effluent external air from said under floor duct, and said main casing is provided with a conditioned air outlet for supply of conditioned air to said cab.

6. A construction machine as defined in claim 1, wherein said cab is tiltably mounted on a fulcrum point at the front of said revolving frame to take a tilt-up and a tilt-down position by turning a rear side, and said seat support plat form, air conditioner unit and under floor duct are tilted with said floor member.

* * * * *